(12) United States Patent
Hazani

(10) Patent No.: US 11,381,099 B2
(45) Date of Patent: Jul. 5, 2022

(54) POWER DISTRIBUTION SYSTEM

(71) Applicant: Corning Optical Communications LLC, Charlotte, NC (US)

(72) Inventor: Ami Hazani, Raanana (IL)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 17/238,053

(22) Filed: Apr. 22, 2021

(65) Prior Publication Data

US 2021/0242703 A1     Aug. 5, 2021

Related U.S. Application Data

(63) Continuation of application No. PCT/US2019/057745, filed on Oct. 24, 2019.
(Continued)

(51) Int. Cl.
*H02J 3/38*      (2006.01)
*H02J 7/00*      (2006.01)
(Continued)

(52) U.S. Cl.
CPC .............. *H02J 7/0068* (2013.01); *G05F 1/46* (2013.01); *H02J 7/345* (2013.01); *H04W 52/0206* (2013.01); *H04W 88/085* (2013.01)

(58) Field of Classification Search
CPC ........ H02J 1/10; H02J 3/38; H02J 4/00; H02J 5/00; G06F 11/2015
(Continued)

(56) References Cited

U.S. PATENT DOCUMENTS

| | | |
|---|---|---|
| 5,774,316 A | 6/1998 | McGary et al. |
| 6,584,197 B1 | 6/2003 | Boudreaux et al. |
| | (Continued) | |

FOREIGN PATENT DOCUMENTS

| | | |
|---|---|---|
| EP | 1347607 A1 | 9/2003 |
| WO | 2004/093283 A1 | 10/2004 |
| | (Continued) | |

OTHER PUBLICATIONS

International Search Report and Written Opinion of the International Searching Authority; PCT/US2019/057745 dated Jan. 16, 2020, 10 pages; European Patent Office.

*Primary Examiner* — Quan Tra
(74) *Attorney, Agent, or Firm* — C. Keith Montgomery

(57) ABSTRACT

Distributing higher currents demanded by a power consuming load(s) exceeding overcurrent limits of a current limiter circuit for a power source in a power distribution system. The power distribution system receives and distributes power from the power source to a power consuming load(s). The power distribution circuit is configured to limit current demand on the power source to not exceed a designed source current threshold limit. The power distribution circuit includes an energy storage circuit. The power distribution circuit is configured to charge the energy storage circuit with current supplied by the power source. Current demanded by the power consuming load(s) exceeding the source current threshold limit of the power source is supplied by the energy storage circuit. Thus, limiting current of the power source while supplying higher currents demanded by power consuming load(s) exceeding the source current limits of the power source can both be accomplished.

30 Claims, 9 Drawing Sheets

Related U.S. Application Data

(60) Provisional application No. 62/750,360, filed on Oct. 25, 2018.

(51) Int. Cl.
  *G05F 1/46* (2006.01)
  *H02J 7/34* (2006.01)
  *H04W 52/02* (2009.01)
  *H04W 88/08* (2009.01)

(58) Field of Classification Search
  USPC .......................................... 307/19; 327/538
  See application file for complete search history.

(56) References Cited

U.S. PATENT DOCUMENTS

| | | | |
|---|---|---|---|
| 7,545,055 B2 | 6/2009 | Barrass | |
| 8,559,150 B2 | 10/2013 | Veroni | |
| 8,605,394 B2 | 12/2013 | Crookham et al. | |
| 8,781,637 B2 | 7/2014 | Eaves | |
| 9,042,732 B2 | 5/2015 | Cune et al. | |
| 9,240,835 B2 | 1/2016 | Berlin et al. | |
| 9,325,429 B2 | 4/2016 | Berlin et al. | |
| 9,497,706 B2 | 11/2016 | Atias et al. | |
| 9,532,329 B2 | 12/2016 | Sauer | |
| 9,673,904 B2 | 6/2017 | Palanisamy et al. | |
| 9,685,782 B2 | 6/2017 | Blackwell et al. | |
| 9,865,782 B2 | 1/2018 | Chiu et al. | |
| 10,020,885 B2 | 7/2018 | Mizrahi et al. | |
| 10,257,056 B2 | 4/2019 | Hazani et al. | |
| 10,263,433 B2 * | 4/2019 | Onizuka | H02J 7/007 |
| 10,404,099 B1 | 9/2019 | Bonja et al. | |
| 10,405,356 B2 | 9/2019 | Hazani et al. | |
| 10,627,839 B2 * | 4/2020 | Ho | G05F 1/46 |
| 10,658,837 B2 | 5/2020 | Hazani | |
| 2002/0030474 A1 * | 3/2002 | Sakiyama | H02J 7/345 |
| | | | 323/288 |
| 2003/0178979 A1 | 9/2003 | Cohen | |
| 2006/0232134 A1 | 10/2006 | Kirkorian | |
| 2011/0007443 A1 | 1/2011 | Crookham et al. | |
| 2013/0033106 A1 | 2/2013 | Schindler et al. | |
| 2014/0243033 A1 | 8/2014 | Wala et al. | |
| 2014/0308044 A1 | 10/2014 | Heidler et al. | |
| 2015/0077130 A1 | 3/2015 | Hackl | |
| 2015/0207318 A1 | 7/2015 | Lowe et al. | |
| 2015/0215001 A1 | 7/2015 | Eaves | |
| 2015/0350756 A1 | 12/2015 | Cune et al. | |
| 2016/0282894 A1 * | 9/2016 | Hazani | H02J 4/00 |
| 2016/0344179 A1 | 11/2016 | Huang et al. | |
| 2016/0352393 A1 | 12/2016 | Berlin et al. | |
| 2017/0025842 A1 | 1/2017 | Peterson | |
| 2017/0054496 A1 | 2/2017 | Hazani | |
| 2017/0070975 A1 | 3/2017 | Ranson et al. | |
| 2018/0048140 A1 | 2/2018 | Takuma et al. | |
| 2018/0351633 A1 | 12/2018 | Birkmeir et al. | |

FOREIGN PATENT DOCUMENTS

| | | |
|---|---|---|
| WO | 2012/071367 A1 | 5/2012 |
| WO | 2016/176314 A1 | 11/2016 |
| WO | 2018/102103 A1 | 6/2018 |
| WO | 2018/178990 A1 | 10/2018 |

\* cited by examiner

POWER DISTRIBUTION SYSTEM

CROSS-REFERENCE TO RELATED APPLICATIONS

This application is a continuation of International Application No. PCT/US2019/057745, filed Oct. 24, 2019, and claims the benefit of priority under 35 U.S.C. § 119 of U.S. Provisional Application No. 62/750,360 filed Oct. 25, 2018, the content of which are relied upon and incorporated herein by references in their entirety.

BACKGROUND

The disclosure relates generally to distribution of power to one or more power consuming devices over power wiring, and more particularly to distributing higher (e.g., in-rush) current demanded by a power consuming load(s) exceeding overcurrent limits of a current limiter circuit for a power source in a power distribution system, such as a remote power distribution system for distributing power to remote units in a distributed communications system (DCS) such as distributed antenna systems (DAS).

Wireless customers are increasingly demanding wireless communications services, such as cellular communications services and (Wireless Fidelity) Wi-Fi services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIGS. 1A and 1B illustrate a distributed communications system (DCS) 100 that is configured to distribute communications services to remote coverage areas 102(1)-102(N), where 'N' is the number of remote coverage areas. The DCS 100 in FIG. 1A is provided in the form of a wireless DCS, such as a DAS 104. The DAS 104 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on RAUs 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the RAUs 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the RAUs 106(1)-106(N).

With continuing reference to FIG. 1A, the RAUs 106(1)-106(N) are configured to receive the downlink communications signals 112D from the central unit 108 over the communications link 114. The downlink communications signals 112D are configured to be distributed to the respective remote coverage areas 102(1)-102(N) of the RAUs 106(1)-106(N). The RAUs 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the RAUs 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to user equipment (UE) 120 within the respective remote coverage areas 102(1)-102(N). The RAUs 106(1)-106(N) are also configured to receive uplink communications signals 112U from the UE 120 in the respective remote coverage areas 102(1)-102(N) to be distributed to the source transceiver 110.

Because the RAUs 106(1)-106(N) include components that require power to operate, such as the RF transmitters/receivers 116(1)-116(N) for example, it is necessary to provide power to the RAUs 106(1)-106(N). In one example, each RAU 106(1)-106(N) may receive power from a local power source. In another example, the RAUs 106(1)-106(N) may be powered remotely from a remote power source(s). For example, the central unit 108 in the DCS 100 in FIGS. 1A and 1B includes a power source 122 that is configured to remotely supply power over the communications links 114 to the RAUs 106(1)-106(N). For example, the communications links 114 may be cable that includes electrical conductors for carrying current (e.g., direct current (DC)) to the RAUs 106(1)-106(N). If the DCS 100 is an optical fiber-based DCS in which the communications links 114 include optical fibers, the communications links 114 may by a "hybrid" cable that includes optical fibers for carrying the downlink and uplink communications signals 112D, 112U and separate electrical conductors for carrying current to the RAUs 106(1)-106(N).

Some regulations, such as IEC 60950-21, may limit the amount of direct current (DC) that is remotely delivered by the power source 122 over the communications links 114 to less than the amount needed to power the RAUs 106(1)-106(N) during peak power consumption periods for safety reasons, such as in the event that a human contacts the wire. One solution to remote power distribution limitations is to employ multiple conductors and split current from the power source 122 over the multiple conductors, such that the current on any one electrical conductor is below the regulated limit. Another solution includes delivering remote power at a higher voltage so that a lower current can be distributed at the same power level. The power source 122 may be equipped with an overcurrent protection circuit to shut down the power source 122 when current demand exceeds a given threshold current. For example, assume that the power source 122 is configured to shut down when delivered current I to the RAU 106 in FIG. 1B reaches 3 Amperes (A). When the power source 122 starts to provide power to the RAU 106 having an internal capacitance C as shown in FIG. 1B, the initially discharged capacitance C draws a higher current to charge from 0 V until the capacitance C is charged. If the power demand by the RAU 106 is 300 Watts and the voltage of the power source 122 is 60 Volts (V), the drawn current I from the power source 122 over the communications links 114 will be 5 Amperes (A) (i.e., 300 W/60 V). In this regard, being that the 3 A current threshold is exceeded in this example, the power source 122 will discontinue delivery of power as a safety precaution, and then may be configured to power-up again at a certain time. However, the cycle of current draw and charging of the capacitance C of the RAU 106 may then repeat again and again with repeated power shut downs. To address this issue, the power source 122 could be selected to have a higher supply voltage V to reduce current I. For example, if power source 122 had a higher supply voltage V of 400 V, the current I flowing through the wires of the communications links 114 for a 300 W power delivery would be 0.75 A (i.e., 300 W/400 V). However, delivering high voltage through electrical conductors may be further regulated to prevent an undesired current from flowing through a human in the event that a human contacts the electrical conductor. Thus, these safety measures may require other protections, such as the use of protection conduits, which may make installations more difficult and add cost.

No admission is made that any reference cited herein constitutes prior art. Applicant expressly reserves the right to challenge the accuracy and pertinency of any cited documents.

SUMMARY

Embodiments of the disclosure relate to distributing higher (e.g., in-rush) currents demanded by a power consuming load(s) exceeding overcurrent limits of a current limiter circuit for a power source in a power distribution system. Related methods are also disclosed. As a non-limiting example, such a power distribution system may be provided for distributed communications systems (DCS). For example, the DCS may be a wireless DCS, such as a distributed antenna system (DAS) that is configured to distribute communications signals, including wireless communications signals, from a central unit to a plurality of remote units over physical communications media, to then be distributed from the remote units wirelessly to client devices in wireless communication range of a remote unit. The remote units in the DCS are power consuming devices that require power to operate and can be powered by the power distribution circuit.

In exemplary aspects disclosed herein, the power distribution system includes a power distribution circuit that is configured to receive power from a power source and distribute the received power over electrical conductors ("power conductors") to one or more remote power consuming loads (e.g., remote units) for powering their operations. To limit the current supplied by the power source to power consuming loads to not exceed a designed source current threshold limit, such as for safety or other design or regulatory limitations, the power distribution circuit includes a source power management circuit (PMC) coupled to the power source. The source PMC is configured to detect and limit current demand on the power source to not exceed a designed source current threshold limit. However, the remote power consuming load(s) may have, from time to time, a higher current demand (e.g., an in-rush current demand) than the source current threshold limit of the source power management circuit. For example, the remote power consuming load(s) may demand a higher current on the power source during an initial connection to the power source or a power-up phase. Instead of having to increase the source current threshold limit in the source power management circuit to not risk discontinuing power distribution to the remote power consuming load(s), which may be undesired or not possible due to design or regulatory limitations, an energy storage circuit (e.g., a capacitor circuit) and a remote PMC(s) are also included in the power distribution circuit. The energy storage circuit is coupled to a source power output of the source PMC that carries current from the power source. The remote PMC(s) is coupled between the energy storage circuit and the remote power consuming load(s). The remote PMC(s) is configured to decouple the remote power consuming load(s) from the source PMC so that the current distributed by the source PMC from the power source charges the energy storage circuit and is not distributed to the remote PMC(s) to be distributed to the remote power consuming load(s). In response to a power-up phase of the remote power consuming load(s), the remote PMC(s) is configured to couple the remote PMC(s) to the remote power consuming load(s) so that current supplied by the power source and distributed by the source PMC is distributed by the remote PMC(s) to the power consuming load(s). However, current demanded by the power consuming load(s) that exceeds source current threshold limit of the power source can be supplied by the stored charge in the energy storage circuit. In this manner, the source current threshold limit of the power source may not be exceeded, causing the source PMC to discontinue distribution of current from the power source, even though an instantaneous current demand of the remote power consuming load(s) exceeds the source current threshold limit of the power source. Thus, both desires of limiting the current of the power source while also being capable of supplying higher currents (e.g., short term in-rush currents) demanded by power consuming load(s) exceeding the source current limits of the power source can be accomplished.

In other exemplary aspects, the remote PMC(s) may also include a current limiting circuit that is configured to limit the current distributed to the power consuming load(s) to a remote current threshold limit to protect the power consuming load(s). However, the remote current threshold limit can be greater than the source current threshold limit limiting the current demand on the power source without risking discontinuation of power, because as discussed above, the energy storage circuit is configured to provide an additional current to the remote PMC to satisfy current demands by the power consuming load(s) that exceed the source current threshold limit. In yet other exemplary aspects, the remote PMC(s) may also include a bypass circuit that is configured to be activated to bypass the current limiting circuit in the remote PMC(s) to reduce energy loss. The remote PMC(s) can be configured to monitor the current level of power distributed to the power consuming load(s) and to deactivate the bypass circuit to limit the current distributed to the power consuming load(s).

In yet other exemplary aspects, the power distribution circuit may include a current detection circuit configured to disconnect the power source from the source PMC in response to detected load on the power conductors in excess of a current threshold level for safety reasons. For example, a human touching the power conductors is an unsafe condition that may be detected by a higher current detected on the power conductors.

For example, the current detection circuit may be included in the source PMC and/or the remote PMC(s). The current detection circuit can be configured to wait a period of time and/or until a manual reset instruction is received, before reconnecting the power source to the power conductors to once again allow current to flow from the power source to the power consuming load(s) serviced by the power distribution circuit.

In this regard, in one exemplary aspect, a power distribution circuit is provided. The power distribution circuit comprises a source PMC. The source PMC comprises a source power input, and a source current limiter circuit coupled to the source power input and a source power output. The source PMC is configured to receive source current of a source power on a source power input from a power source. The source current limiter circuit is configured to limit the source current to a source current threshold limit to generate a limited source current. The source PMC is further configured to distribute the limited source current on the source power output. The power distribution circuit also comprises one or more remote PMCs. The one or more remote PMCs each comprise a remote power output coupled to a remote unit among one or more remote units. The one or more remote PMCs also are each configured to receive a remote current on a remote power input coupled to the source power output based on the limited source current, and distribute the remote current to the remote unit coupled to the remote power output. The power distribution circuit also comprises an energy storage circuit coupled to source power output. The energy storage circuit is configured to store energy from the limited source current on the source power output in response to a current demand by the one or more remote PMCs being less than the source current threshold limit.

An additional aspect of the disclosure relates to a method of distributing power to one or more remote units in a power distribution system. The method comprises receiving a source current of a source power from a power source. The method also comprises limiting the source current to a source current threshold limit to generate a limited source current. The method also comprises distributing the limited source current to at least one remote PMC among one or more remote PMCs. The method also comprises receiving a remote current at each remote PMC among the at least one remote PMC based on the limited source current. The method also comprises distributing the remote current to a remote unit coupled to the remote PMC in response to a current demand by the at least one remote PMC among the one or more remote PMCs. The method also comprises storing energy from the limited source current in an energy storage circuit coupled to the at least one remote PMC in response to the current demand by the at least one remote PMC among the one or more remote PMCs being less than the source current threshold limit. The method also comprises discharging stored energy in the energy storage circuit in response to the current demand of the at least one remote PMC being greater than the source current threshold limit.

An additional aspect of the disclosure relates to a DCS. The DCS comprises a central unit configured to distribute one or more downlink communications signals over one or more downlink communications links to a plurality of remote units, and distribute received one or more uplink communications signals from the plurality of remote units from one or more uplink communications links to one or more source communications outputs. The DCS comprises the plurality of remote units, wherein each remote unit among the plurality of remote units is configured to distribute at least one received downlink communications signal among the one or more downlink communications signals from the one or more downlink communications links, to one or more client devices, and distribute the one or more uplink communications signals from the one or more client devices to the one or more uplink communications links. The DCS also includes a power distribution circuit. The power distribution circuit comprises a source PMC comprising a source power input, and a source current limiter circuit coupled to the source power input and a source power output. The source PMC is configured to receive source current of a source power on a source power input from a power source. The source current limiter circuit is configured to limit the source current to a source current threshold limit to generate a limited source current. The source PMC is further configured to distribute the limited source current on the source power output. The power distribution circuit also comprises a plurality of remote PMCs each comprising a remote power output coupled to a remote unit among the plurality of remote units. Each of the plurality of remote PMCs is configured to receive a remote current on a remote power input coupled to the source power output based on the limited source current, and distribute the remote current to the remote unit coupled to the remote power output. The power distribution circuit also comprises an energy storage circuit coupled to source power output. The energy storage circuit is configured to store energy from the limited source current on the source power output in response to a current demand by the plurality of remote PMCs being less than the source current threshold limit.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Figure 1A:
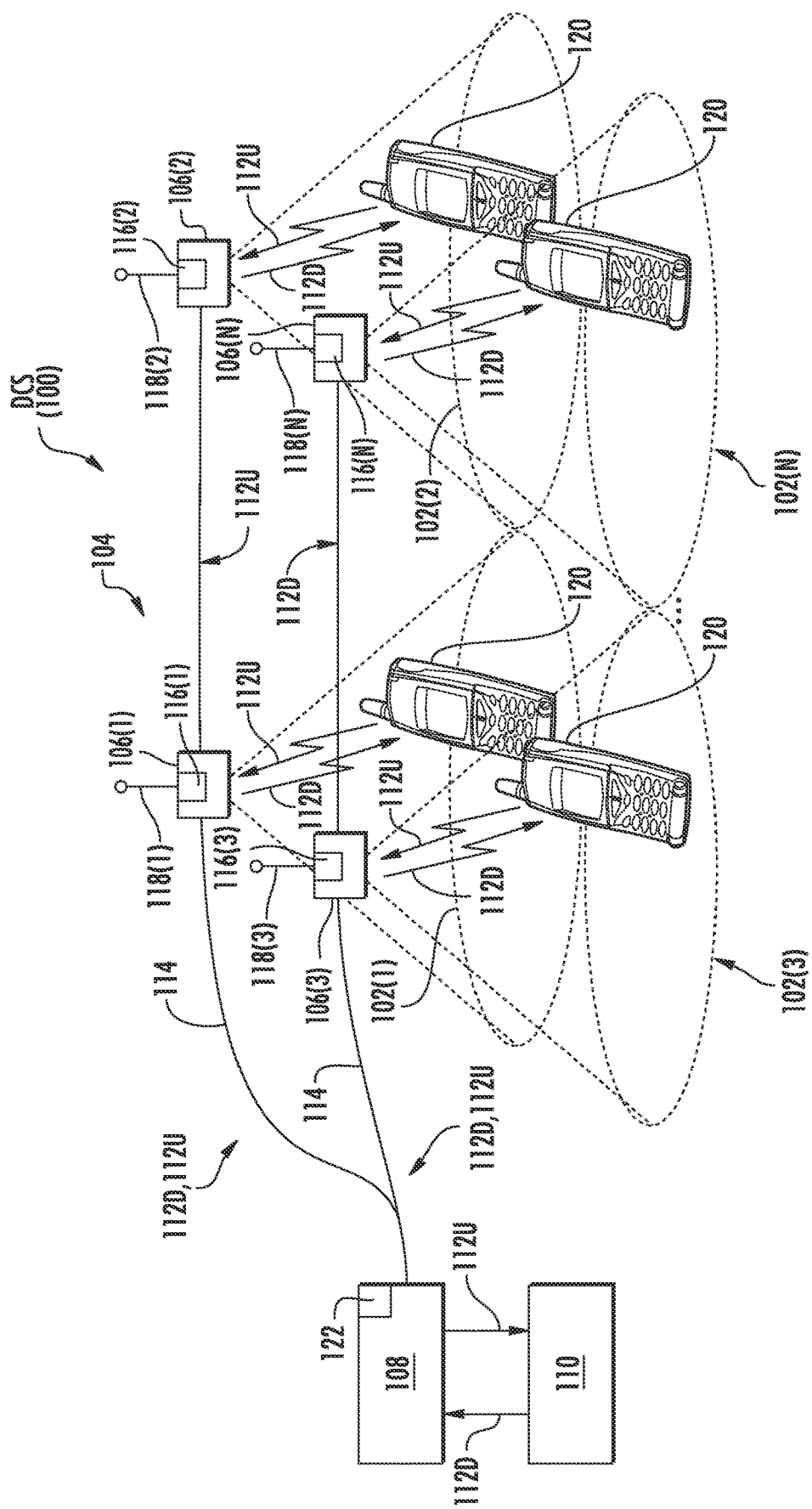
FIG. 1A is a schematic diagram of an exemplary distributed communications system (DCS) in the form of a distributed antenna system (DAS)
Figure 1B:
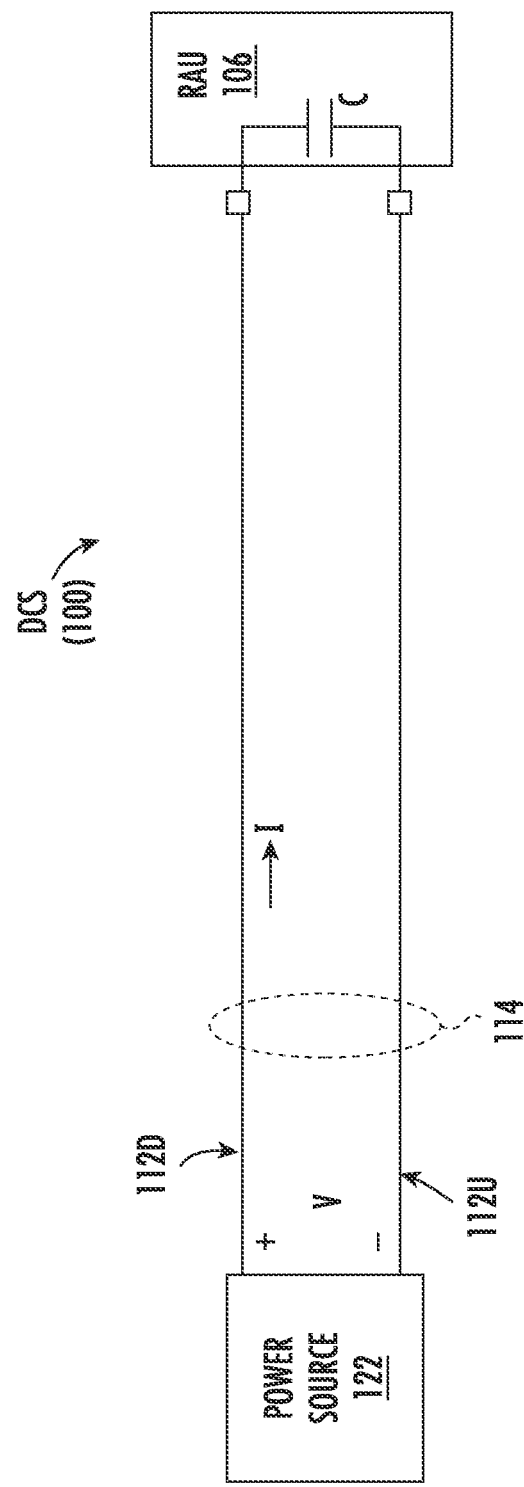
FIG. 1B is a schematic diagram of the DCS in FIG. 1A illustrating a remote power source delivering power to a remote antenna unit (RAU)

Embodiments of the disclosure relate to distributing higher (e.g., in-rush) currents demanded by a power consuming load(s) exceeding overcurrent limits of a current limiter circuit for a power source in a power distribution system. Related methods are also disclosed. As a non-limiting example, such a power distribution system may be provided for distributed communications systems (DCS). For example, the DCS may be a wireless DCS, such as a distributed antenna system (DAS) that is configured to distribute communications signals, including wireless communications signals, from a central unit to a plurality of remote units over physical communications media, to then be distributed from the remote units wirelessly to client devices in wireless communication range of a remote unit. The remote units in the DCS are power consuming devices that require power to operate and can be powered by the power distribution circuit.

In exemplary aspects disclosed herein, the power distribution system includes a power distribution circuit that is configured to receive power from a power source and distribute the received power over electrical conductors ("power conductors") to one or more remote power consuming loads (e.g., remote units) for powering their operations. To limit the current supplied by the power source to power consuming loads to not exceed a designed source current threshold limit, such as for safety or other design or regulatory limitations, the power distribution circuit includes a source power management circuit (PMC) coupled to the power source. The source PMC is configured to detect and limit current demand on the power source to not exceed a designed source current threshold limit. However, the remote power consuming load(s) may have, from time to time, a higher current demand (e.g., an in-rush current demand) than the source current threshold limit of the source power management circuit. For example, the remote power consuming load(s) may demand a higher current on the power source during an initial connection to the power source or a power-up phase. Instead of having to increase the source current threshold limit in the source power management circuit to not risk discontinuing power distribution to the remote power consuming load(s), which may be undesired or not possible due to design or regulatory limitations, an energy storage circuit (e.g., a capacitor circuit) and a remote PMC(s) are also included in the power distribution circuit. The energy storage circuit is coupled to a source power output of the source PMC that carries current from the power source. The remote PMC(s) is coupled between the energy storage circuit and the remote power consuming load(s). The remote PMC(s) is configured to decouple the remote power consuming load(s) from the source PMC so that the current distributed by the source PMC from the power source charges the energy storage circuit and is not distributed to the remote PMC(s) to be distributed to the remote power consuming load(s). In response to a power-up phase of the remote power consuming load(s), the remote PMC(s) is configured to couple the remote PMC(s) to the remote power consuming load(s) so that current supplied by the power source and distributed by the source PMC is distributed by the remote PMC(s) to the power consuming load(s). However, current demanded by the power consuming load(s) that exceeds source current threshold limit of the power source can be supplied by the stored charge in the energy storage circuit. In this manner, the source current threshold limit of the power source may not be exceeded, causing the source PMC to discontinue distribution of current from the power source, even though an instantaneous current demand of the remote power consuming load(s) exceeds the source current threshold limit of the power source. Thus, both desires of limiting the current of the power source while also being capable of supplying higher currents (e.g., short term in-rush currents) demanded by power consuming load(s) exceeding the source current limits of the power source can be accomplished.

Figure 2:
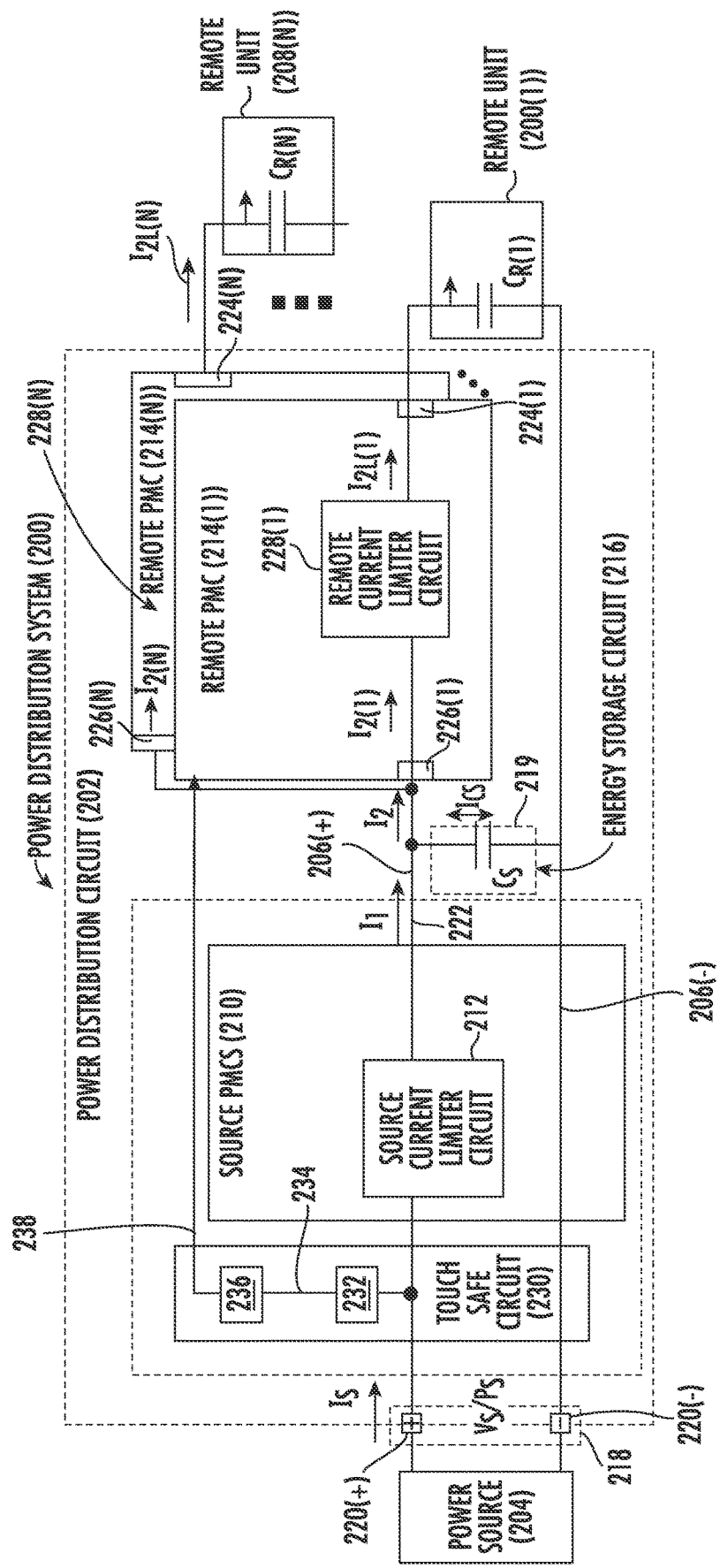
FIG. 2 is a schematic diagram of an exemplary power distribution system that includes a power distribution circuit configured to receive power from a power source and distribute the received power over power conductors to one or more remote power consuming loads for powering their operations, wherein the power distribution circuit is further configured to distribute higher current demanded by a power consuming load(s) exceeding overcurrent limits of a current limiter circuit for the power source in the power distribution system.

In this regard, FIG. 2 is a schematic diagram of an exemplary power distribution system 200 that includes a power distribution circuit 202 configured to receive power from a power source 204 of a source voltage VS and distribute the received power over power conductors 206(+), 206(−) to one or more remote units 208(1)-208(N), which are power consuming loads and have capacitance loads CR(1)-CR(N). The remote units 208(1)-208(N) use the received distributed power over the power conductors 206(+), 206(−) for powering operations of electronic circuits in the remote units 208(1)-208(N). As a non-limiting example, the power distribution system 200 may be within a DCS, such as a DAS or small cell radio access network (RAN), where the remote units 208(1)-208(N) are communications devices that are configured to distribute received communications signals to client devices. As will be discussed in more detail below, the power distribution circuit 202 includes a source PMC 210 that is configured to receive a source current $I_S$ from the power source 204 that results in remote current $I_2$ being distributed to the remote units 208(1)-208(N) for powering their operations. To limit the source current $I_S$ supplied by the power source 204 to not exceed a designed source current threshold limit, such as for safety or other design or regulatory limitations, the source PMC 210 includes a source current limiter circuit 212 to limit source current $I_S$ demand by the remote units 208(1)-208(N) on the power source 204 to not exceed a designed source current threshold limit. The source current limiter circuit 212 limits the source current $I_S$ to a limited source current $I_1$, which is the source of a remote current $I_2$ being distributed to the remote units 208(1)-208(N) for powering their operations. For example, the source current limiter circuit 212 may be a hot-swap circuit that includes its own current sensor and shut off circuit/switch. Hot-swap circuits are commonly used in some power supplies may also be employed in the power source 204 itself. The remote current $I_2$ is supplied to one or more remote PMCs 214(1)-214(N) that are part of the power distribution circuit 202, wherein each remote PMC 214(1)-214(N) is associated with and coupled to a remote unit 208(1)-208(N). The remote current $I_2$ demanded by the remote units 208(1)-208(N) through the remote PMCs 214(1)-214(N) is split between the remote units 208(1)-208(N) according to their respective proportional impedances as a voltage divider in this example.

With continuing reference to FIG. 2, note that remote units 208(1)-208(N) may have, from time to time, a higher current demand than the limited source current $I_1$ that can be demanded of the power source 204 and distributed by the source PMC 210 to the remote PMCs 214(1)-214(N). For example, the remote units 208(1)-208(N) may demand a higher current during an initial connection to the remote PMCs 214(1)-214(N) of the power distribution circuit 202 or a power-up phase that creates an in-rush current demand on the source PMC 210 and the power source 204. However, increasing the source current threshold limit of the source current limiter circuit 212 to meet these higher current demands of the remote units 208(1)-208(N) to not risk interruption of power distribution to the remote units 208(1)-208(N) may be undesired or not possible due to design or regulatory limitations.

In this regard, as shown in the power distribution system 200 in FIG. 2, the power distribution circuit 202 also includes an energy storage circuit 216 that is coupled in parallel to the power conductors 206(+), 206(−) between the source PMC 210 and the remote PMCs 214(1)-214(N). In this example, the energy storage circuit 216 is a capacitor circuit 219, which is capacitor Cs in this example. The energy storage circuit 216 is configured to store energy from the limited source current $I_1$ when the remote current $I_2$ representing the current demand by remote PMCs 214(1)-214(N) is less than the limited source current $I_1$ in a charging phase (i.e., $I_2 < I_1$). For example, as discussed in more detail below, the remote PMCs 214(1)-214(N) may be configured to keep the remote units 208(1)-208(N) electrically disconnected from the power distribution circuit 202 during the charging phase to prevent a current demand of the remote current $I_2$ higher than the source current threshold limit of the limited source current $I_1$ until the energy storage circuit 216 is sufficient charged. Then later, if the current demand for the remote current $I_2$ by the remote PMCs 214(1)-214(N) is higher than the source current threshold limit of the limited source current $I_1$ that can be distributed by the source PMC 210 (e.g., an in-rush current demand), the higher demanded remote current $I_2$ can be satisfied by the limited source current $I_1$ distributed by the source PMC 210 and a current $I_{CS}$ that is generated by the energy storage circuit 216 in a discharge phase based on a stored charge from the limited source current $I_1$ in the charge phase (e.g., remote current $I_2$=limited source current $I_1$+current $I_{CS}$). The energy storage circuit 216 acts as a second power source to supplement the power supplied by the source PMC 210. In this manner, the source current threshold limit of the power source 204 enforced by the source current limiter circuit 212 of the source PMC 210 is not exceeded, which may otherwise cause an interruption or discontinuation of power from the power source 204. For example, the power source 204 may be designed to automatically shut off when the current demand on the power source 204 exceeds its internal current demand limits.

Thus, in the power distribution circuit 202 in FIG. 2, limiting the source current $I_S$ of the power source 204 while also being capable of supplying higher currents (e.g., short term in-rush currents) demanded by remote units 208(1)-208(N) exceeding the source current limits of the power source 204 and the source current limiter circuit 212 in the source PMC 210 can be accomplished. The power distribution circuit 202 in FIG. 2 is configured to supply a higher remote current $I_2$ demanded by the remote units 208(1)-208(N) than the source current threshold limit of the limited source current $I_1$ without risking the shutting off (tripping) the power source and/or without having to choose a power source 204 that can supply a higher current for peak operations, when a lower current power source would be sufficient for nominal operations. Also, it may not be possible to choose a power source 204 for the power distribution system 200 that has increased current demand capability due to regulatory or other safety considerations.

More exemplary detail of the power distribution circuit 202 in FIG. 2 will now be described. The source PMC 210 in the power distribution circuit 202 includes a source power input 218 configured to be coupled to the power source 204. The source power input 218 has two terminals, a positive terminal 220(+) and a negative terminal 220(−). The source PMC 210 is configured to receive the source current $I_S$ of a source power $P_S$ of the power source 204 on the source power input 218. The source current limiter circuit 212 of the source PMC 210 is coupled to the source power input 218 and a source power output 222. The source current limiter circuit 212 is configured to limit the source current $I_S$ to a source current threshold limit to generate the limited source current $I_1$. The source current limiter circuit 212 is configured to distribute the limited source current $I_1$ on the source power output 222 to be distributed to the remote PMCs 214(1)-214(N). The remote PMCs 214(1)-214(N) each include a respective remote power output 224(1)-224(N) coupled to a respective remote unit 208(1)-208(N) as power-consuming loads. The remote PMCs 214(1)-214(N) are each configured to receive a respective remote current $I_{2(1)}$-$I_{2(N)}$ split from the remote current $I_2$ on a respective remote power input 226(1)-226(N) in the remote PMCs 214(1)-214(N) coupled to the source power output 222. The remote current $I_2$ is based on the limited source current $I_1$ as a source of current. The remote PMCs 214(1)-214(N) are configured to distribute the respective remote currents $I_{2(1)}$-$I_{2(N)}$ to the respective remote power outputs 224(1)-224(N) to be distributed to coupled remote units 208(1)-208(N).

With continuing reference to FIG. 2, the energy storage circuit 216 is also coupled to the source power output 222. The energy storage circuit 216 is configured to store energy from the limited source current $I_1$ on the source power output 222 in response to the current demands by the one or more remote PMCs 214(1)-214(N) being less than the source current threshold limit of the source current limiter circuit 212. This situation can occur when the current demand by the remote PMCs 214(1)-214(N) is less than the limited source current $I_1$ from the source current limiter circuit 212. For example, this situation can occur when a remote unit 208(1)-208(N) is physically or electrically disconnected from a remote PMC 214(1)-214(N). Likewise, the energy storage circuit 216 is configured to not store energy from the limited source current $I_1$ on the source power output 222 when the current demand by the remote PMCs 214(1)-214(N) is equal to or greater than the source current threshold limit of the source current limiter circuit 212. This situation can occur when the current demands by the remote PMCs 214(1)-214(N) is equal to or greater than the limited source $I_1$ from the source current limiter circuit 212. For example, this situation can occur when one or more of the remote units 208(1)-208(N) are electrically connected to a remote PMC 214(1)-214(N). For example, when a remote unit 208(1)-208(N) is initially connected to a remote PMC 214(1)-214(N) and/or powered-up, the remote unit 208(1)-208(N) may have an in-rush current situation wherein the total of the demanded remote currents $I_{2(1)}$-$I_{2(N)}$ is greater than the source current threshold limit imposed by the source current limiter circuit 212 on the source current $I_S$ resulting in the limited source current $I_1$. Thus, in the power distribution circuit 202 in FIG. 2, when the total of the demanded remote currents $I_{2(1)}$-$I_{2(N)}$ is greater than limited source current $I_1$ such that the demand for the remote current $I_2$ is greater than the limited source current $I_1$, the energy storage circuit 216 is configured to discharged stored energy in the form of current $I_{CS}$ on the source power output 222 to be added to the limited source current $I_1$ to provide the remote current $I_2$. If the energy storage circuit 216 is a capacitor circuit 219, the capacitor circuit 219 may be sufficiently sized to store enough energy to supplement the limited source current $I_1$ to meet the demand for the remote currents $I_{2(1)}$-$I_{2(N)}$ by all of the remote units 208(1)-208(N). Alternatively, the energy storage circuit 216 could be provided by individual energy storage circuits provided in each remote PMC 214(1)-214(N) that are coupled between the respective remote power inputs 226(1)-226(N) and the remote power outputs 224(1)-224(N).

With continuing reference to FIG. 2, it may also be desired to limit the remote currents $I_{2(1)}$-$I_{2(N)}$ as limited remote currents $I_{2(1)}$-$I_{2(N)}$ that are distributed by the respective remote PMCs 214(1)-214(N) to their electrically connected remote units 208(1)-208(N). This may be desired for safety reasons for example. In this regard, the remote PMCs 214(1)-214(N) include optional remote current limiter circuits 228(1)-228(N) that are coupled to the respective remote power inputs 226(1)-226(N). The remote current limiter circuits 228(1)-228(N) are coupled to and between the respective remote power inputs 226(1)-226(N) and the remote power outputs 224(1)-224(N) of the remote PMCs 214(1)-214(N). The remote current limiter circuits 228(1)-228(N) are each configured to limit the received remote currents $I_{2(1)}$-$I_{2(N)}$ to limited remote currents $I_{2L(1)}$-$I_{2L(N)}$ according to a designed remote current threshold limit to be distributed to the remote units 208(1)-208(N). For example, the source current limiter circuit 212 may be a hot-swap circuit that includes its own current sensor and shut off circuit/switch. Hot-swap circuits are commonly used in some power supplies.

With continuing reference to FIG. 2, the source PMC 210 may also include a touch safe circuit 230 that is configured to instruct the remote units 208(1)-208(N) to electrically disconnect from their respective remote PMCs 214(1)-214(N) in the event a current measured on the power conductors 206(+), 206(−) is greater than expected. This may occur for example in an event that causes a short circuit between the positive and negative terminals 220(+), 220(−) or the power conductors 206(+), 206(−) such as human touch on conductors coupled to positive and negative terminals 220(+), 220(−) or power conductors 206(+), 206(−) that causes an increased and unexpected current demand on the power source 204. In this regard, the touch safe circuit 230 can include a current measurement circuit 232 that is coupled to the source power input 218 and configured to measure the source current $I_S$ at the source power input 218. The current measurement circuit 232 generates a current measurement on a current measurement output 234 based on the measured source current $I_S$ at the source power input 218. The touch safe circuit 230 also includes a safety control circuit 236 configured to receive the measured current measurement output 234. The safety control circuit 236 is configured to determine if the measured source current $I_S$ exceeds a predefined current threshold level. In response to the measured source current $I_S$ exceeding the predefined current threshold level, the safety control circuit 236 is configured to generate a distribution power connection control signal 238 to the remote units 208(1)-208(N) to cause the remote units 208(1)-208(N) to electrically decouple from the respective remote PMCs 214(1)-214(N). The remote units 208(1)-208(N) can be instructed periodically to connect back to the remote PMCs 214(1)-214(N) so that there is a current demand on the power source 204 for the current measurement circuit 232 measure the source current $I_S$ at the source power input 218. If the source current $I_S$ again exceeds the predefined current threshold level, the safety control circuit 236 can generate the distribution power connection control signal 238 to the remote units 208(1)-208(N) to cause the remote units 208(1)-208(N) to electrically decouple from the respective remote PMCs 214(1)-214(N). Examples of touch safety circuits that can be included as the touch safety circuit 230 in the power distribution circuit 202 are disclosed in PCT Patent Application Publication No. PCT/IL18/050368 entitled "SAFETY POWER DISCONNECTION FOR POWER DISTRIBUTION OVER POWER CONDUCTORS TO POWER CONSUMING DEVICES," filed on Mar. 29, 2018, which is incorporated herein by reference in its entirety.

Figure 3:
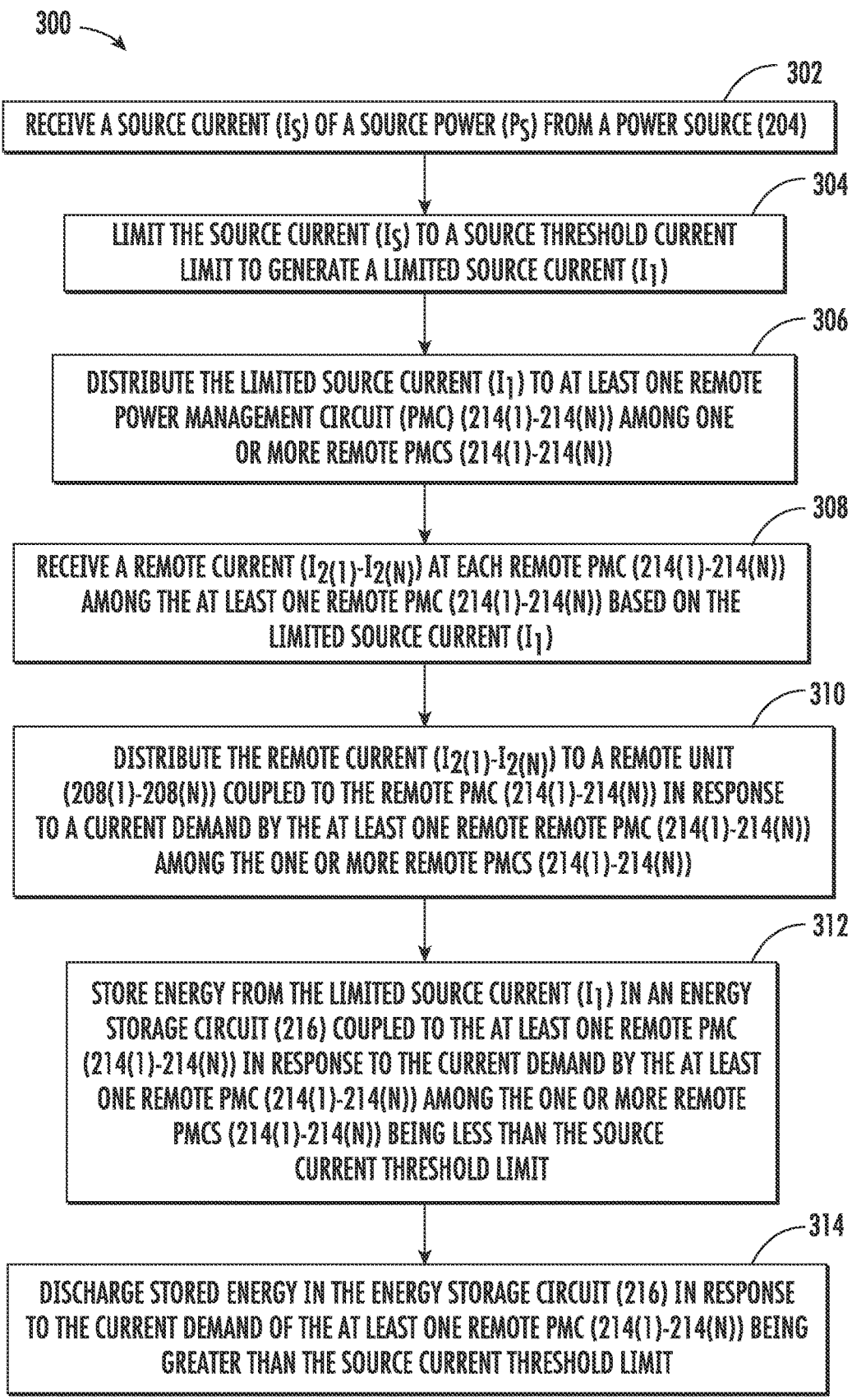
FIG. 3 is a flowchart illustrating an exemplary process of the power distribution circuit in the power distribution system in FIG. 2 distributing higher current demanded by a power consuming load(s) exceeding overcurrent limits of a current limiter circuit for the power source in the power distribution system.

FIG. 3 is a flowchart illustrating an exemplary process 300 of the power distribution circuit 202 in the power distribution system 200 in FIG. 2 distributing higher current demanded by the remote units 208(1)-208(N) exceeding overcurrent limits of the source current limiter circuit 212 in the source PMC 210. The exemplary process 300 in FIG. 3 will be described with reference to the power distribution circuit 202 in FIG. 2. In this regard, a first exemplary step is that the source PMC 210 receives the source current $I_S$ of the source power $P_S$ from the power source 204 on the source power input 218 (block 302 in FIG. 3). A next exemplary step is that the source current limiter circuit 212 limits the source current $I_S$ to the source current threshold limit to generate the limited source current $I_1$ (block 304 in FIG. 3). A next exemplary step is for the source PMC 210 to distribute the limited source current $I_1$ to at least one remote PMC 214(1)-214(N) among remote PMCs 214(1)-214(N) (block 306 in FIG. 3). A next exemplary step is that the remote PMCs 214(1)-214(N) receive remote currents $I_{2(1)}$-$I_{2(N)}$ at each remote PMC 214(1)-214(N) among the at least one remote PMC 214(1)-214(N) based on a splitting of the limited source current $I_1$ (block 308 in FIG. 3). A next exemplary step is for the remote PMCs 214(1)-214(N) to distribute the remote currents $I_{2(1)}$-$I_{2(N)}$ to the remote units 208(1)-208(N) coupled to the remote PMCs 214(1)-214(N) in response to a current demand by the remote PMCs 214(1)-214(N) (block 310 in FIG. 3). A next exemplary step is to store energy from the limited source current $I_1$ in the energy storage circuit 216 coupled to remote PMCs 214(1)-214(N) in response to the current demand by the remote PMCs 214(1)-214(N) being less than the source current threshold limit of the source current limiter circuit 212 (block 312 in FIG. 3). A next exemplary step is to discharge stored energy in the energy storage circuit 216 to remote PMCs 214(1)-214(N) in response to the current demand by the remote PMCs 214(1)-214(N) being greater than the source current threshold limit of the source current limiter circuit 212 (block 314 in FIG. 3).

Figure 4:
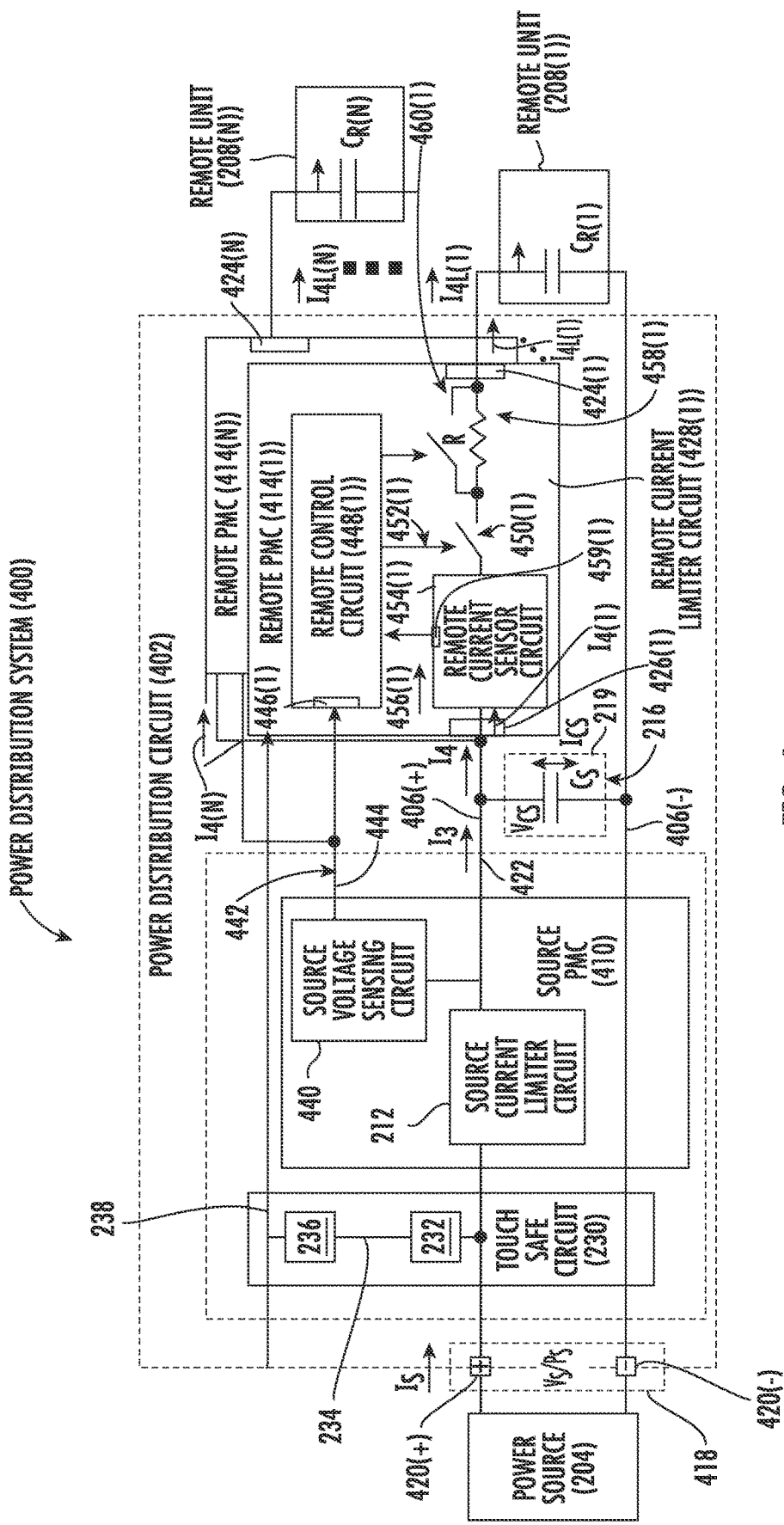
FIG. 4 is a schematic diagram of another exemplary power distribution system that includes a power distribution circuit configured to receive power from a power source and distribute the received power over power conductors to one or more remote power consuming loads for powering their operations, wherein the power distribution circuit is further configured to distribute higher current demanded by a power consuming load(s) exceeding overcurrent limits of a current limiter circuit for the power source in the power distribution system.

FIG. 4 is a schematic diagram of another exemplary power distribution system 400 that includes a power distribution circuit 402 configured to receive power from the power source 204 of a source voltage VS and distribute the received power over power conductors 406(+), 406(−) to one or more remote units 208(1)-208(N), which are power consuming loads. Common components between the power distribution system 400 in FIG. 4 and the power distribution circuit 202 in FIG. 2 are shown with common element numbers between FIGS. 2 and 4 and will not be re-described. Like the power distribution system 200 in FIG. 2, the power distribution system 200 may be within a DCS, such as a DAS, or small cell RAN, where the remote units 208(1)-208(N) are communications devices that are configured to distribute received communications signals to client devices. As will be discussed in more detail below, the power distribution circuit 402 includes a source PMC 410 that is configured to receive a source current $I_S$ from the power source 204 that results in remote current $I_4$ being distributed to the remote units 208(1)-208(N) for powering their operations. To limit the source current $I_S$ supplied by the power source 204 to not exceed the designed source current threshold limit, such as for safety or other design or regulatory limitations, the source PMC 410 includes the source current limiter circuit 212 to limit source current $I_S$ demand by the remote units 208(1)-208(N) on the power source 204 to not exceed a designed source current threshold limit. The remote current $I_4$ is supplied to one or more remote PMCs 414(1)-414(N) that are part of the power distribution circuit 402, wherein each remote PMC 414(1)-414(N) is associated with and coupled to a remote unit 208(1)-208(N). The remote current $I_4$ demanded by the remote units 208(1)-208(N) through the remote PMCs 214(1)-214(N) is split between the remote units 208(1)-208(N) according to their respective proportional impedances as a voltage divider in this example.

With continuing reference to FIG. 4, as shown in the power distribution system 400 in FIG. 4, the power distribution circuit 402 includes the energy storage circuit 216 that is coupled in parallel to the power conductors 406(+), 406(−), between the source PMC 410 and the remote PMCs 414(1)-414(N). Like the power distribution circuit 202 in FIG. 2, the energy storage circuit 216 in the power distribution circuit 402 in FIG. 4 is configured to store energy from a limited source current $I_3$ when the remote current $I_4$ representing the current demand by remote PMCs 414(1)-414(N) is less than the limited source current $I_3$ in a charging phase (i.e., $I_4$<$I_3$). For example, as discussed in more detail below, the remote PMCs 414(1)-414(N) may be configured to keep the remote units 208(1)-208(N) electrically disconnected from the power distribution circuit 402 during the charging phase to prevent a current demand of the remote current $I_4$ higher than the source current threshold limit of the limited source current $I_3$ until the energy storage circuit 216 is sufficient charged. Then later, if the current demand for the remote current $I_4$ by the remote PMCs 414(1)-414(N) is higher than the source current threshold limit of the limited source current $I_3$ that can be distributed by the source PMC 410 (e.g., an in-rush current demand), the higher demanded remote current $I_4$ can be satisfied by the limited source current $I_3$ distributed by the source PMC 410 and a current $I_{CS}$ that is generated by the energy storage circuit 216 in a discharge phase based on a stored charge from the limited source current $I_3$ in the charge phase (e.g., remote current $I_4$=limited source current $I_3$+current $I_{CS}$). The energy storage circuit 216 acts as a second power source to supplement the power supplied by the source PMC 410. In this manner, the source current threshold limit of the power source 204 enforced by the source current limiter circuit 212 of the source PMC 410 is not exceeded, which may otherwise cause an interruption or discontinuation of power from the power source 204. For example, the power source 204 may be designed to automatically shut off when the current demand on the power source 204 exceeds its internal current demand limits.

Thus, in the power distribution circuit 402 in FIG. 4, limiting the source current $I_S$ of the power source 204 while also being capable of supplying higher currents (e.g., short term in-rush currents) demanded by remote units 208(1)-208(N) exceeding the source current limits of the power source 204 and the source current limiter circuit 212 in the source PMC 410 can be accomplished. The power distribution circuit 402 in FIG. 4 is configured to supply a higher remote current $I_4$ demanded by the remote units 208(1)-208(N) than the source current threshold limit of the limited source current $I_3$ without risking the shutting off (tripping) the power source and/or without having to choose a power source 204 that can supply a higher current for peak operations, when a lower current power source would be sufficient for nominal operations. Also, it may not be possible to choose a power source 204 for the power distribution system 200 that has increased current demand capability due to regulatory or other safety considerations.

More exemplary detail of the power distribution circuit 402 in FIG. 4 will now be described. The source PMC 410 in the power distribution circuit 402 includes a source power input 418 configured to be coupled to the power source 204. The source power input 418 has two terminals, a positive terminal 420(+) and a negative terminal 420(−). The source PMC 410 is configured to receive the source current $I_S$ of a source power $P_S$ of the power source 204 on the source power input 418. The source current limiter circuit 212 of the source PMC 410 is coupled to the source power input 418 and a source power output 422. The source current limiter circuit 212 is configured to limit the source current $I_S$ to a source current threshold limit to generate the limited source current $I_3$. The source current limiter circuit 212 is configured to distribute the limited source current $I_3$ on the source power output 422 to be distributed to the remote PMCs 414(1)-414(N). The remote PMCs 414(1)-414(N) each include a respective remote power output 424(1)-424(N) coupled to a respective remote unit 208(1)-208(N) as power-consuming loads. The remote PMCs 414(1)-414(N) are each configured to receive a respective remote current $I_{4(1)}$-$I_{4(N)}$ split from the remote current $I_4$ on a respective remote power input 426(1)-426(N) in the remote PMCs 414(1)-414(N) coupled to the source power output 422. The remote current $I_4$ is based on the limited source current $I_3$ as a source of current. The remote PMCs 414(1)-414(N) are configured to distribute the respective remote currents $I_{4(1)}$-$I_{4(N)}$ to the respective remote power outputs 424(1)-424(N) to be distributed to coupled remote units 208(1)-208(N).

With continuing reference to FIG. 4, the energy storage circuit 216 is also coupled to the source power output 422. The energy storage circuit 216 is configured to store energy from the limited source current $I_3$ on the source power output 422 in response to the current demands by the one or more remote PMCs 414(1)-414(N) being less than the source current threshold limit of the source current limiter circuit 212. This situation occurs when the current demand by the remote PMCs 414(1)-414(N) is less than the source current threshold limit of the source current limiter circuit 212. For example, this situation can occur when a remote unit 208(1)-208(N) is physically or electrically disconnected from a remote PMC 414(1)-414(N). Likewise, the energy storage circuit 216 is configured to not store energy from the limited source current $I_3$ on the source power output 422 when the current demand by the one or more remote PMCs 414(1)-414(N) is equal to or greater than the source current threshold limit of the source current limiter circuit 212. This situation occurs when the current demands by the remote PMCs 414(1)-414(N) is equal to or greater than the source current threshold limit of the source current limiter circuit 212. For example, this situation can occur when one or more of the remote units 208(1)-208(N) is electrically connected to a remote PMC 414(1)-414(N). For example, when a remote unit 208(1)-208(N) is initially connected to a remote PMC 414(1)-414(N) and/or powered-up, the remote unit 208(1)-208(N) may have an in-rush current situation wherein the total of the demanded remote currents $I_{4(1)}$-$I_{4(N)}$ is greater than the source current threshold limit imposed by the source current limiter circuit 212 on the source current $I_S$ resulting in the limited source current $I_3$. Thus, in the power distribution circuit 402 in FIG. 4, when the total of the demanded remote currents $I_{4(1)}$-$I_{4(N)}$ is greater than limited source current $I_3$ such that the demand for the remote current $I_4$ is greater than the limited source current $I_3$, the energy storage circuit 216 is configured to discharge stored energy in the form of current $I_{CS}$ on the source power output 422 to be added to the limited source current $I_3$ to provide the remote current $I_4$. If the energy storage circuit 216 is a capacitor circuit 219 which is shown as capacitor Cs, the capacitor Cs may be sufficiently sized to store enough energy to supplement the limited source current $I_3$ to meet the demand for the remote currents $I_{4(1)}$-$I_{4(N)}$ by all of the remote units 208(1)-208(N). Alternatively, the energy storage circuit 216 could be provided by individual energy storage circuits provided in each remote PMC 414(1)-414(N) that are coupled between the respective remote power inputs 426(1)-426(N) and the remote power outputs 424(1)-424(N).

With continuing reference to FIG. 4, the source PMC 410 may also include the touch safe circuit 230 that is configured to instruct the remote units 208(1)-208(N) to electrically disconnect from their respective remote PMCs 414(1)-414(N) in the event a current measured on the power conductors 406(+), 406(−) is greater than expected. This may occur for example an event that causes a short circuit between the positive and negative terminals 420(+), 420(−) or the power conductors 406(+), 406(−) such as human touch on conductors coupled to positive and negative terminals 420(+), 420(−) or power conductors 406(+), 406(−) that causes and increased and unexpected current demand on the power source 204. In this regard, the touch safe circuit 230 can include the current measurement circuit 232 that is coupled to the source power input 418 and configured to measure the source current $I_S$ at the source power input 418. The current measurement circuit 232 generate a current measurement on a current measurement output 234 based on the measured current at the source power input 418. The touch safe circuit 230 also includes the safety control circuit 236 configured to receive the measured current measurement output 234. The safety control circuit 236 is configured to determine if the measured source current $I_S$ exceeds a predefined current threshold level. In response to the measured source current $I_S$ exceeding the predefined current threshold level, the safety control circuit 236 is configured to generate the distribution power connection control signal 238 to the remote units 208(1)-208(N) to cause the remote units 208(1)-208(N) to electrically decouple from the respective remote PMCs 414(1)-414(N). The remote units 208(1)-208(N) can be instructed periodically to connected back to the remote PMCs 414(1)-414(N) so that there is a current demand on the power source 204 for the current measurement circuit 232 measure the source current $I_S$ at the source power input 418. If the source current $I_S$ again exceeds the predefined current threshold level, the safety control circuit 236 can generate the distribution power connection control signal 238 to the remote units 208(1)-208(N) to cause the remote units 208(1)-208(N) to electrically decouple from the respective remote PMCs 414(1)-414(N). Examples of touch safety circuits that can be included as the touch safety circuit 230 in the power distribution circuit 402 are disclosed in PCT Patent Application Publication No. PCT/IL18/050368 entitled "SAFETY POWER DISCONNECTION FOR POWER DISTRIBUTION OVER POWER CONDUCTORS TO POWER CONSUMING DEVICES," filed on Mar. 29, 2018, which is incorporated herein by reference in its entirety.

As discussed above, the energy storage circuit 216 in the power distribution circuit 402 in FIG. 4 is configured to store energy from the limited source current $I_3$ on the source power output 422 in response to the current demands by the remote PMCs 414(1)-414(N) being less than the source threshold current limit of the source current limiter circuit 212. In this regard, in a charge phase, it may be desired to provide for the remote units 208(1)-208(N) to be electrically disconnected from remote PMCs 414(1)-414(N) so that there is no current demand by the remote PMCs 414(1)-414(N) on the source PMC 410 and the power source 204 so that the energy storage circuit 216 is charged by the limited source current $I_3$. Then, when the energy storage circuit 216 is charged, the remote PMCs 414(1)-414(N) can electrically connect their respective remote units 208(1)-208(N) so that their peak demand remote currents $I_{4(1)}$-$I_{4(N)}$ can be satisfied, such as from in-rush current demands. However, a mechanism is needed to determine when remote PMCs 414(1)-414(N) should electrically disconnect from and connect to the remote units 208(1)-208(N). In this regard, in the power distribution circuit 402, the source PMC 410 includes a source voltage sensing circuit 440 to the source power output 422. The source voltage sensing circuit 440 coupled is configured to sense the source voltage VS on the source power output 422 and generate a source voltage state signal 442 on a source voltage state output 444 based on the sensed source voltage VS. Before the energy storage circuit 216 is fully charged, the voltage $V_{CS}$ across the energy storage circuit 216 is increasing as charging occurs from limited source current $I_3$. The source voltage sensing circuit 440 generates the source voltage state signal 442 indicating a charging state, meaning the energy storage circuit 216 is charging. When fully charged after time of capacitance $C_S$*the source voltage $V_S$ divided by the limited source current $I_3$ (i.e., $C_S$*$V_S$/$I_3$), the voltage $V_{CS}$ across the energy storage circuit 216 is approximately the source voltage $V_S$, and the source voltage sensing circuit 440 generates the source voltage state signal 442 indicating a charged state, meaning the energy storage circuit 216 is charged.

The source voltage state signal 442 is communicated to a respective remote voltage state input 446(1)-446(N) of remote control circuits 448(1)-448(N) in the respective remote PMCs 414(1)-414(N). The remote control circuits 448(1)-448(N) are configured to cause a remote switch 450(1)-450(N) coupled to the remote power outputs 424(1)-424(N) and located between the remote power inputs 426(1)-426(N) and the remote power outputs 424(1)-424(N) to be opened and closed based on the state of the source voltage state signal 442. The remote control circuits 448(1)-448(N) are configured to generate switch signals 452(1)-452(N) to cause the respective remote switches 450(1)-450(N) to be opened to decouple the distribution of the remote current $I_{4(1)}$-$I_{4(N)}$ from the remote power outputs 424(1)-424(N) in response to the source voltage state signal 442 indicating a charging state, meaning voltage level of the voltage $V_{CS}$ across the energy storage circuit 216 is less than a source voltage $V_S$. However, in response to the source voltage state signal 442 indicating a charged state, meaning voltage level of the voltage $V_{CS}$ across the energy storage circuit 216 is approximately equal to the source voltage $V_S$, the remote control circuits 448(1)-448(N) are configured to generate the switch signals 452(1)-452(N) cause the respective remote switches 450(1)-450(N) to be closed to couple the distribution of the remote current $I_{4(1)}$-$I_{4(N)}$ to the remote power outputs 424(1)-424(N) to place loads on the source PMC 410 and power source 204. Thus, if the total current demand by the remote units 208(1)-208(N) is greater than the limited source current $I_3$, the energy storage circuit 216 can discharge stored energy to cause a current $I_{CS}$ to flow to the source power output 422 to supplement and be additive to limited source current $I_3$. For example, the remote switches 450(1)-450(N) may be implemented as transistors, or alternatively SCRs of TRIACs.

It may also be desired to provide for the remote PMCs 414(1)-414(N) to be able to open their respective remote switches 450(1)-450(N) to protect the remote units 208(1)-208(N) from a current overload situation like the functionality of the source current limiter circuit 212 provided in the source PMC 410. This may be desired for safety reasons for example. In this regard, the remote PMCs 414(1)-414(N) in FIG. 4 also include respective remote current sensor circuits 454(1)-454(N). The remote control circuits 448(1)-448(N) along with their respective remote switches 450(1)-450(N) and respective remote current sensor circuits 454(1)-454(N) form remote current limiter circuits 428(1)-428(N) in the respective remote PMCs 414(1)-414(N). For example, the remote current limiter circuits 428(1)-428(N) may be considered hot-swap circuits.

In this regard, as shown in the power distribution circuit 402 in FIG. 4, the remote PMCs 414(1)-414(N) each include a respective remote current sensor circuit 454(1)-454(N) coupled to their remote power inputs 426(1)-426(N). The remote current sensor circuits 454(1)-454(N) are configured to generate a respective remote current signal 456(1)-456(N) on a respective remote current state output 459(1)-459(N) coupled to the remote control circuits 448(1)-448(N). The remote control circuits 448(1)-448(N) are configured to cause the remote switches 450(1)-450(N) to be opened to decouple the distribution of the remote currents $I_{4(1)}$-$I_{4(N)}$ to the remote power outputs 424(1)-424(N) in response to the remote current signals 456(1)-456(N) indicating a current level greater than a designed or programmed remote current threshold as a overcurrent state. Likewise, the remote control circuits 448(1)-448(N) are also configured to cause the remote switches 450(1)-450(N) to be closed to couple the distribution of the remote currents $I_{4(1)}$-$I_{4(N)}$ to the remote power outputs 424(1)-424(N) in response to the remote current signals 456(1)-456(N) indicating a current level less than or equal to the remote current threshold as a non-overcurrent state. In this regard, if the remote control circuits 448(1)-448(N) have determined an overcurrent state, the remote control circuits 448(1)-448(N) can periodically cause the remote switches 450(1)-450(N) to be closed to allow the remote current sensor circuits 454(1)-454(N) to measure the remote currents $I_{4(1)}$-$I_{4(N)}$ to determine if the overcurrent state still exists. If the overcurrent state still exists, the remote control circuits 448(1)-448(N) can cause the remote switches 450(1)-450(N) to be opened again to decouple the distribution of the remote currents $I_{4(1)}$-$I_{4(N)}$ to the remote power outputs 424(1)-424(N).

It may also be desired to provide for the remote PMCs 414(1)-414(N) to be able to limit the remote currents $I_{4(1)}$-$I_{4(N)}$ to the remote power outputs 424(1)-424(N) like the source current limiter circuit 212 in the source PMC 410 when the remote switches 450(1)-450(N) are closed to protect the remote units 208(1)-208(N). This can also protect an overcurrent demand on the source PMC 410. For example, when the remote switches 450(1)-450(N) are initially closed, the remote units 208(1)-208(N) may have high initial current demands for the remote currents $I_{4(1)}$-$I_{4(N)}$ that could damage the remote units 208(1)-208(N) if not limited. In this regard, the remote current limiter circuits 428(1)-428(N) also include current limiting resistor circuits 458(1)-458(N) in this example. The current limiting resistor circuits 458(1)-458(N) are configured to limit the remote currents $I_{4(1)}$-$I_{4(N)}$ distributed to the remote power outputs 424(1)-424(N) coupled to the remote units 208(1)-208(N). Note that the total current of the limited remote currents $I_{4L(1)}$-$I_{4L(N)}$ may still be greater than the limited source current $I_3$, which can be accommodated by the energy storage circuit 216 as discussed above. The source PMC 410 can also be configured to progressively communicate the distribution power connection control signal 238 to the remote units 208(1)-208(N) to cause the remote units 208(1)-208(N) to electrically couple to their respective remote PMCs 214(1)-214(N) progressively to minimize initial currents demands.

Energy loss occurs in the current limiting resistor circuits 458(1)-458(N) through heat dissipation. To reduce this energy loss, the remote current limiter circuits 428(1)-428(N) may also include remote current limiter bypass switches 460(1)-460(N) that are coupled to remote power outputs 424(1)-424(N) between the remote power outputs 424(1)-424(N) and the remote current sensor circuits 454(1)-454(N). The remote control circuits 448(1)-448(N) are configured to cause the remote current limiter bypass switches 460(1)-460(N) to be opened to cause the current limiting resistor circuits 458(1)-458(N) to limit the received respective remote currents $I_{4(1)}$-$I_{4(N)}$ to the limited remote currents $I_{4L(1)}$-$I_{4L(N)}$, in response to the source voltage state signal 442 indicating a voltage level of the voltage $V_{CS}$ across the energy storage circuit 216 and the remote current signals 456(1)-456(N) indicating a non-overcurrent state. However, after a defined period of time has passed according to the design of the remote control circuits 448(1)-448(N) of the remote PMCs 414(1)-414(N), the remote control circuits 448(1)-448(N) can cause the remote current limiter bypass switches 460(1)-460(N) to be closed to bypass and short circuit the current limiting resistor circuits 458(1)-458(N) to reduce energy loss. As an example, the current limiting resistor circuits 458(1)-458(N) may be negative temperature coefficient (NTC) resistors. The use of NTC resistors can provide an additional current limiting mechanism on in-rush currents caused by current demand of the remote units 208(1)-208(N). The initial resistance of the NTC resistors is high and therefore the initial limited remote currents $I_{4L(1)}$-$I_{4L(N)}$ may is reduced. But after a short period of time, the NTC resistors warm up and their resistances decrease allowing the limited remote currents $I_{4L(1)}$-$I_{4L(N)}$ to ramp up gradually. When remote current limiter bypass switches 460(1)-460(N) are closed, the power consumption by the NTC resistors is reduced almost to zero, allowing the NTC resistors to cool down and get ready for the next operation. The use of NTC resistors for the current limiting resistor circuits 458(1)-458(N) in combination with the remote current limiter bypass switches 460(1)-460(N) can avoid the need for more costly higher current limiting transistors. For example, the remote current limiter bypass switches 460(1)-460(N) may be implemented as transistors, or alternatively SCRs of TRIACs.

Thus in summary, in one exemplary operation of the power distribution circuit 402 in FIG. 4, the remote switches 450(1)-450(N) and the remote current limiter bypass switches 460(1)-460(N) are initially caused to be opened by the respective remote control circuits 448(1)-448(N) in the remote PMCs 414(1)-414(N). This decouples the loads of the remote units 208(1)-208(N) from the remote PMCs 414(1)-414(N) to cause the limited source current $I_3$ to charge the energy storage circuit 216. The source current limiter circuit 212 in the source PMC 410 limits the source current $I_S$ to the limited source current $I_3$. Once the voltage $V_{CS}$ across the energy storage circuit 216 reaches the source voltage $V_S$, the source voltage sensing circuit 440 in the source PMC 410 voltage generates the source voltage state signal 442 to the remote control circuits 448(1)-448(N) indicating a voltage level of the voltage $V_{CS}$ across the energy storage circuit 216 reaches the source voltage $V_S$. In response, the remote control circuits 448(1)-448(N) cause their respective remote switches 450(1)-450(N) to be closed to allow the remote currents $I_{4(1)}$-$I_{4(N)}$ to flow to the remote current limiter circuits 428(1)-428(N) to provide the limited remote currents $I_{4L(1)}$-$I_{4L(N)}$ to the remote units 208(1)-208(N). The remote control circuits 448(1)-448(N) cause their respective remote current limiter bypass switches 460(1)-460(N) to be opened or are left open to allow the remote currents $I_{4(1)}$-$I_{4(N)}$ to flow to the current limiting resistor circuits 458(1)-458(N) to generate the limited remote currents $I_{L4(1)}$-$I_{L4(N)}$. After a defined period of time, remote control circuits 448(1)-448(N) cause their respective remote current limiter bypass switches 460(1)-460(N) to be closed to bypass the current limiting resistor circuits 458(1)-458(N) to avoid heat loss through the current limiting resistor circuits 458(1)-458(N). The remote control circuits 448(1)-448(N) are configured to determine from the remote current sensor circuits 454(1)-454(N) if the remote currents $I_{4(1)}$-$I_{4(N)}$ are in a current overload condition. If so, the remote control circuits 448(1)-448(N) can cause the respective remote switches 450(1)-450(N) and remote current limiter bypass switches 460(1)-460(N) to be opened, and then cause remote switches 450(1)-450(N) to be closed to check the current overload condition. If the current overload condition still exists, the remote control circuits 448(1)-448(N) can again can cause the respective remote switches 450(1)-450(N) and remote current limiter bypass switches 460(1)-460(N) to be opened, and the process repeated.

Figure 5:
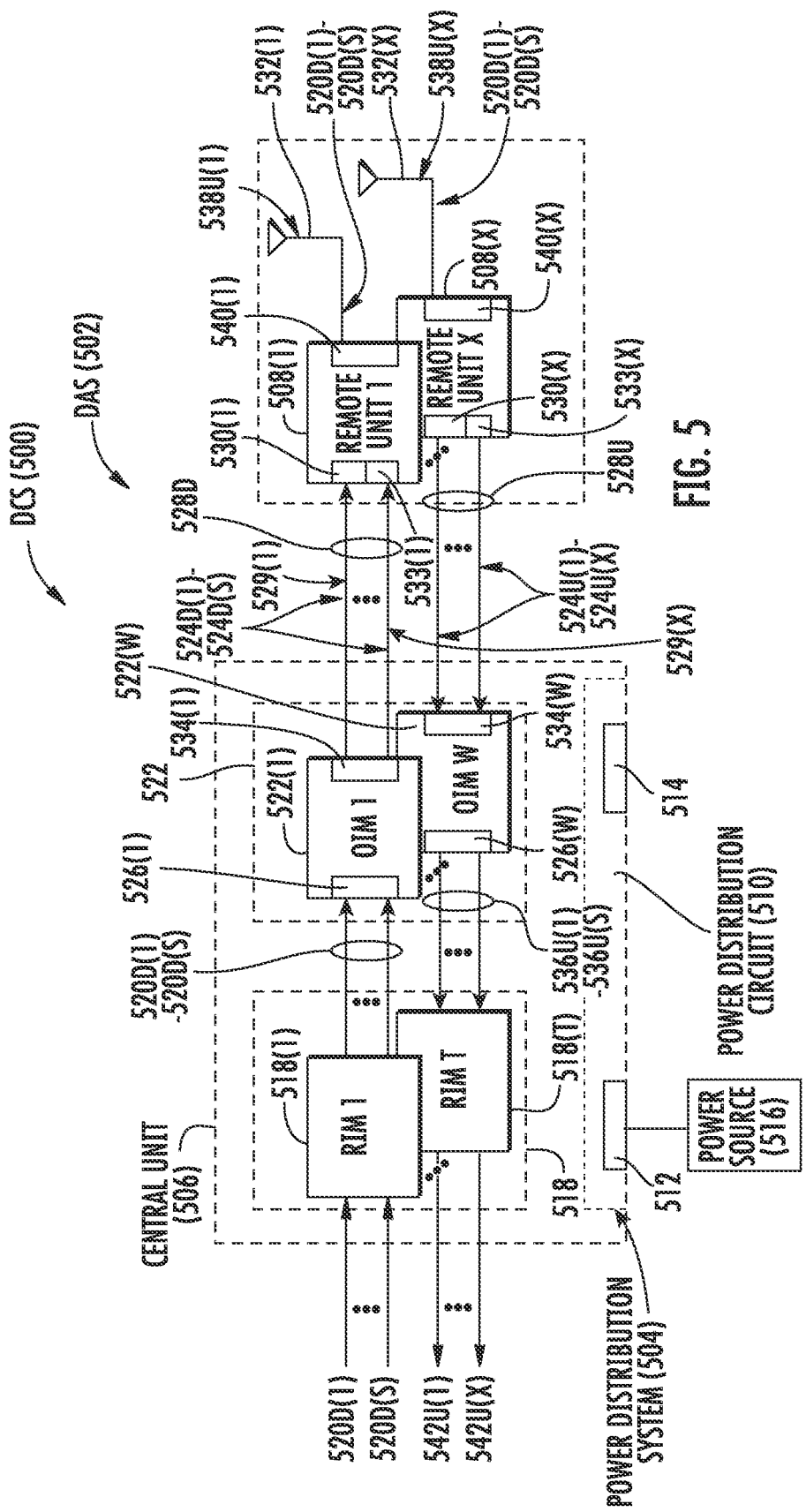
FIG. 5 is a schematic diagram of an exemplary optical-fiber based DCS in the form of a DAS that includes a power distribution circuit configured to receive power from a power source and distribute the received power over power conductors to one or more remote power consuming loads for powering their operations, wherein the power distribution circuit is further configured to distribute higher current demanded by a power consuming load(s) exceeding overcurrent limits of a current limiter circuit for the power source in the power distribution system.

Power distribution systems that include a power distribution circuit configured to receive power from a power source and distribute the received power over power conductors to one or more remote power consuming loads for powering their operations, wherein the power distribution circuit is further configured to distribute higher current demanded by a power consuming load(s) exceeding overcurrent limits of a current limiter circuit for the power source in the power distribution system, can be provided is a distributed communications system. For example, FIG. 5 is a schematic diagram of a distributed communications system 500 in the form of a DAS 502 that includes a power distribution system 504. The power distribution system 504 can include, for example, the power distribution systems 200, 400 in FIGS. 2 and 4 as examples. A DAS, including DAS 502 in FIG. 5, is a system that is configured to distribute communications signals, including wireless communications signals, from a central unit 506 to a plurality of remote units 508(1)-508(X) over physical communications media, to then be distributed from the remote units 508(1)-508(X) wirelessly to client devices in wireless communication range of a remote unit 508(1)-508(X). The power distribution system 504 includes a power distribution circuit 510 that includes a source PMC 512 and a remote PMC 514. The source PMC 512 is configured to receive power from a power source 516 and distribute the received power over power conductors to the remote units 508(1)-508(X) for powering their operations. The power distribution circuit 510 is further configured to distribute higher current demanded by a power consuming load(s) exceeding overcurrent limits of a current limiter circuit for the power source 516 in the power distribution system 504.

With reference to FIG. 5, the DAS 502 in this example is an optical fiber-based DAS that is comprised of three (3) main components. One or more radio interface circuits provided in the form of radio interface modules (RIMS) 518(1)-518(T) are provided in the central unit 506 to receive and process downlink electrical communications signals 520D(1)-520D(S) prior to optical conversion into downlink optical communications signals. The downlink electrical communications signals 520D(1)-520D(S) may be received from a base transceiver station (BTS) or baseband unit (BBU) as examples. The downlink electrical communications signals 520D(1)-520D(S) may be analog signals or digital signals that can be sampled and processed as digital information. The RIMS 518(1)-518(T) provide both downlink and uplink interfaces for signal processing. The notations "1-S" and "1-T" indicate that any number of the referenced component, 1-S and 1-T, respectively, may be provided.

With continuing reference to FIG. 5, the central unit 506 is configured to accept the plurality of RIMS 518(1)-518(T) as modular components that can easily be installed and removed or replaced in a chassis. In one embodiment, the central unit 506 is configured to support up to twelve (12) RIMs 518(1)-518(12). Each RIM 518(1)-518(T) can be designed to support a particular type of radio source or range of radio sources (i.e., frequencies) to provide flexibility in configuring the central unit 506 and the DAS 502 to support the desired radio sources. For example, one RIM 518 may be configured to support the Personal Communication Services (PCS) radio band. Another RIM 518 may be configured to support the 700 MHz radio band. In this example, by inclusion of these RIMS 518, the central unit 506 could be configured to support and distribute communications signals, including those for the communications services and communications bands described above as examples.

The RIMs 518(1)-518(T) may be provided in the central unit 506 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 5, the received downlink electrical communications signals 520D(1)-520D(S) are provided to a plurality of optical interfaces provided in the form of optical interface modules (OIMs) 522(1)-522(W) in this embodiment to convert the downlink electrical communications signals 520D(1)-520D(S) into downlink optical communications signals 524D(1)-524D(S). The notation "1-W" indicates that any number of the referenced component 1-W may be provided. The OIMs 522(1)-552(W) may include one or more optical interface components (OICs) that contain electrical-to-optical (E-O) converters 526(1)-526(W) to convert the received downlink electrical communications signals 520D(1)-520D(S) into the downlink optical communications signals 524D(1)-524D(S). The OIMs 522(1)-552(W) support the radio bands that can be provided by the RIMs 518(1)-518(T), including the examples previously described above. The downlink optical communications signals 524D(1)-524D(S) are communicated over a downlink communications link 528D to the plurality of remote units 508(1)-508(X) provided in the form of remote antenna units in this example. The notation "1-X" indicates that any number of the referenced component 1-X may be provided. One or more of the downlink optical communications signals 524D(1)-524D(S) can be distributed to each remote unit 508(1)-508(X). Thus, the distribution of the downlink optical communications signals 524D(1)-524D(S) from the central unit 506 to the remote units 508(1)-508(X) is in a point-to-multipoint configuration in this example. The power distribution system 504 may also be configured to provide power signals 529(1)-529(X) based on power received from the power source 516 over electrical conductors over the downlink communications link 528D. For example, the downlink communications link 528D may be a hybrid cable that includes electrical conductors and optical fibers.

With continuing reference to FIG. 5, the remote units 508(1)-508(X) include optical-to-electrical (O-E) converters 530(1)-530(X) configured to convert the one or more received downlink optical communications signals 524D(1)-524D(S) back into the downlink electrical communications signals 520D(1)-520D(S) to be wirelessly radiated through antennas 532(1)-532(X) in the remote units 508(1)-508(X) to user equipment (not shown) in the reception range of the antennas 532(1)-532(X). The remote units 508(1)-508(X) may also include power interfaces 533(1)-533(X) to receive the power signals 529(1)-529(X) distributed by the central unit 506 to provide power for operations. For example, the downlink communications link 528D may be a hybrid cable that includes electrical conductors and optical fibers. The OIMs 522(1)-522(W) may also include O-E converters 534(1)-534(W) to convert received uplink optical communications signals 524U(1)-524U(X) from the remote units 508(1)-508(X) into uplink electrical communications signals 536U(1)-536U(S) as will be described in more detail below.

With continuing reference to FIG. 5, the remote units 508(1)-508(X) are also configured to receive uplink electrical communications signals 538U(1)-538U(X) received by the respective antennas 532(1)-532(X) from client devices in wireless communication range of the remote units 508(1)-508(X). The uplink electrical communications signals 538U(1)-538U(X) may be analog signals or digital signals that can be sampled and processed as digital information. The remote units 508(1)-508(X) include E-O converters 540(1)-540(X) to convert the received uplink electrical communications signals 538U(1)-538U(X) into the uplink optical communications signals 524U(1)-524U(X). The remote units 508(1)-508(X) distribute the uplink optical communications signals 524U(1)-524U(X) over an uplink optical fiber communication link 528U to the OIMs 522(1)-522(W) in the central unit 506. The O-E converters 534(1)-534(W) convert the received uplink optical communications signals 524U(1)-524U(X) into uplink electrical communications signals 542U(1)-542U(X), which are processed by the RIMs 518(1)-518(T) and provided as the uplink electrical communications signals 542U(1)-542U(X) to a source transceiver such as a base transceiver station (BTS) or baseband unit (BBU).

Note that the downlink communications link 528D and the uplink optical fiber communications link 528U coupled between the central unit 506 and the remote units 508(1)-508(X) may be a common optical fiber communications link, wherein for example, wave division multiplexing (WDM) may be employed to carry the downlink optical communications signals 524D(1)-524D(S) and the uplink optical communications signals 524U(1)-524U(X) on the same optical fiber communications link. Alternatively, the downlink communications link 528D and the uplink optical fiber communications link 528U coupled between the central unit 506 and the remote units 508(1)-508(X) may be single, separate optical fiber communications link, wherein for example, wave division multiplexing (WDM) may be employed to carry the downlink optical communications signals 524D(1)-524D(S) on one common downlink optical fiber and the uplink optical communications signals 524U(1)-524U(X) carried on a separate, only uplink optical fiber. Alternatively, the downlink communications link 528D and the uplink optical fiber communications link 528U coupled between the central unit 506 and the remote units 508(1)-508(X) may be separate optical fibers dedicated to and providing a separate communications link between the central unit 506 and each remote unit 508(1)-508(X).

Figure 6:
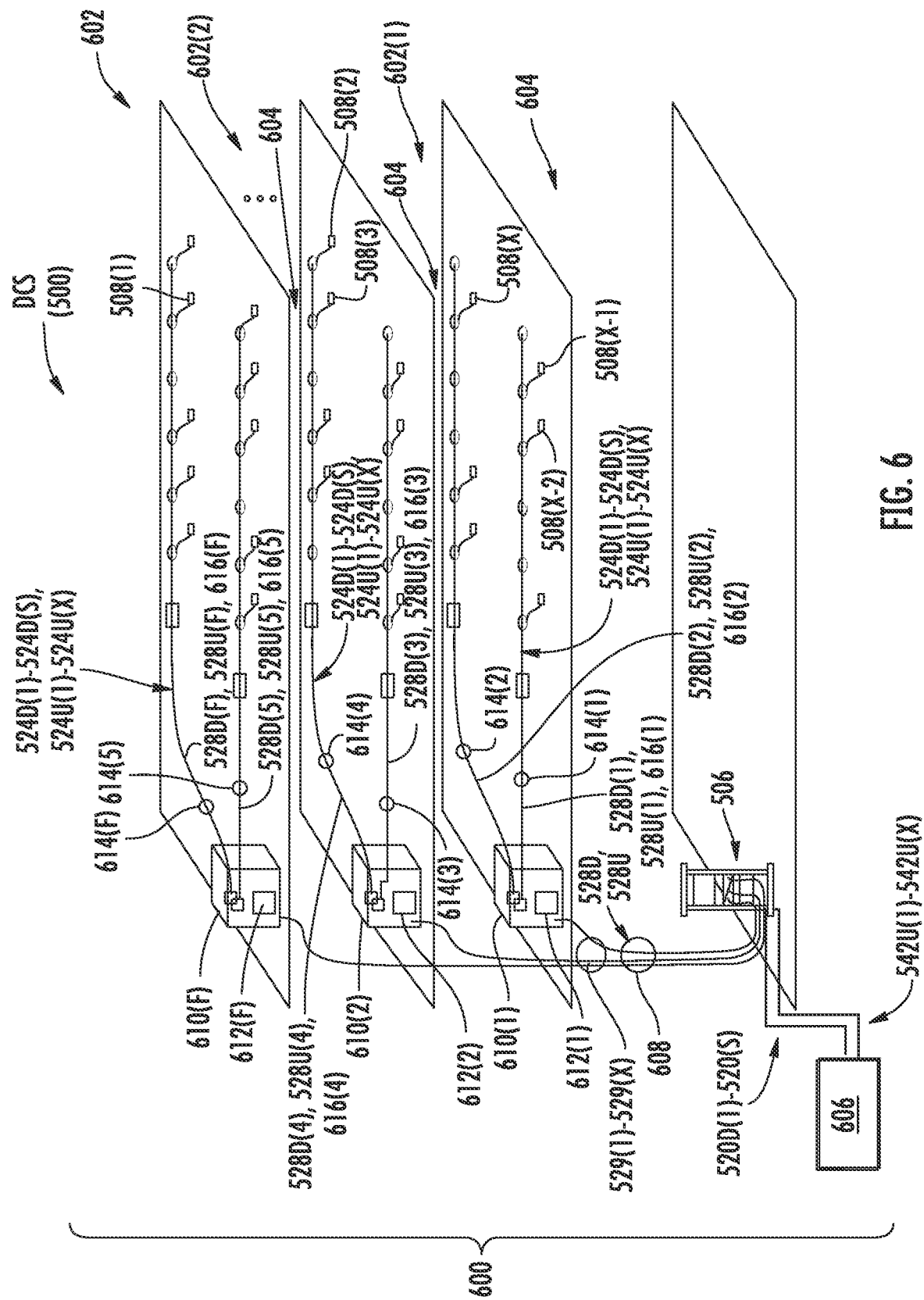
FIG. 6 is a schematic diagram of an exemplary building infrastructure with a deployed DCS and a power distribution system configured to receive power from a power source and distribute the received power over power conductors to one or more remote power consuming loads for powering their operations, wherein the power distribution circuit is further configured to distribute higher current demanded by a power consuming load(s) exceeding overcurrent limits of a current limiter circuit for the power source in the power distribution system, including but not limited to the power distribution systems in FIGS. 2, 4, and 5.

The DCS 500 in FIG. 5 can be provided in an indoor environment as illustrated in FIG. 6. FIG. 6 is a partially schematic cut-away diagram of a building infrastructure 600 employing the DCS 500. With reference to FIG. 6, the building infrastructure 600 in this embodiment includes a first (ground) floor 602(1), a second floor 602(2), and a Fth floor 602(F), where 'F' can represent any number of floors. The floors 602(1)-602(F) are serviced by the central unit 506 to provide antenna coverage areas 604 in the building infrastructure 600. The central unit 506 is communicatively coupled to a signal source 606, such as a BTS or BBU, to receive the downlink electrical communications signals 520D(1)-520D(S). The central unit 506 is communicatively coupled to the remote units 508(1)-508(X) to receive the uplink optical communications signals 524U(1)-524U(X) from the remote units 508(1)-508(X) as previously described in FIG. 5. The downlink and uplink optical communications signals 524D(1)-524D(S), 524U(1)-524U(X) are distributed between the central unit 506 and the remote units 508(1)-508(X) over a riser cable 608 in this example. The riser cable 608 may be routed through interconnect units (ICUs) 610(1)-610(F) dedicated to each floor 602(1)-602(F) for routing the downlink and uplink optical communications signals 524D(1)-524D(S), 524U(1)-524U(X) and power signals 529(1)-529(X) to the remote units 508(1)-508(X). The ICUs 610(1)-610(F) may alternative include power distribution circuits 612(1)-612(F) like the power distribution system 504 in FIG. 5 that include power sources and are configured to distribute power remotely to their respective remote units 508(1)-508(X) to provide power for operations. For example, array cables 614(1)-614(F) may be provided and coupled between the ICUs 610(1)-610(F) that contain both optical fibers to provide respective downlink and uplink optical fiber communications links 528D(1)-528D(F), 528U(1)-528U(F) and power conductors 616(1)-616(F) (e.g., electrical wire) to carry current from the respective power distribution circuits 612(1)-612(F) to the remote units 508(1)-508(X).

Figure 7:
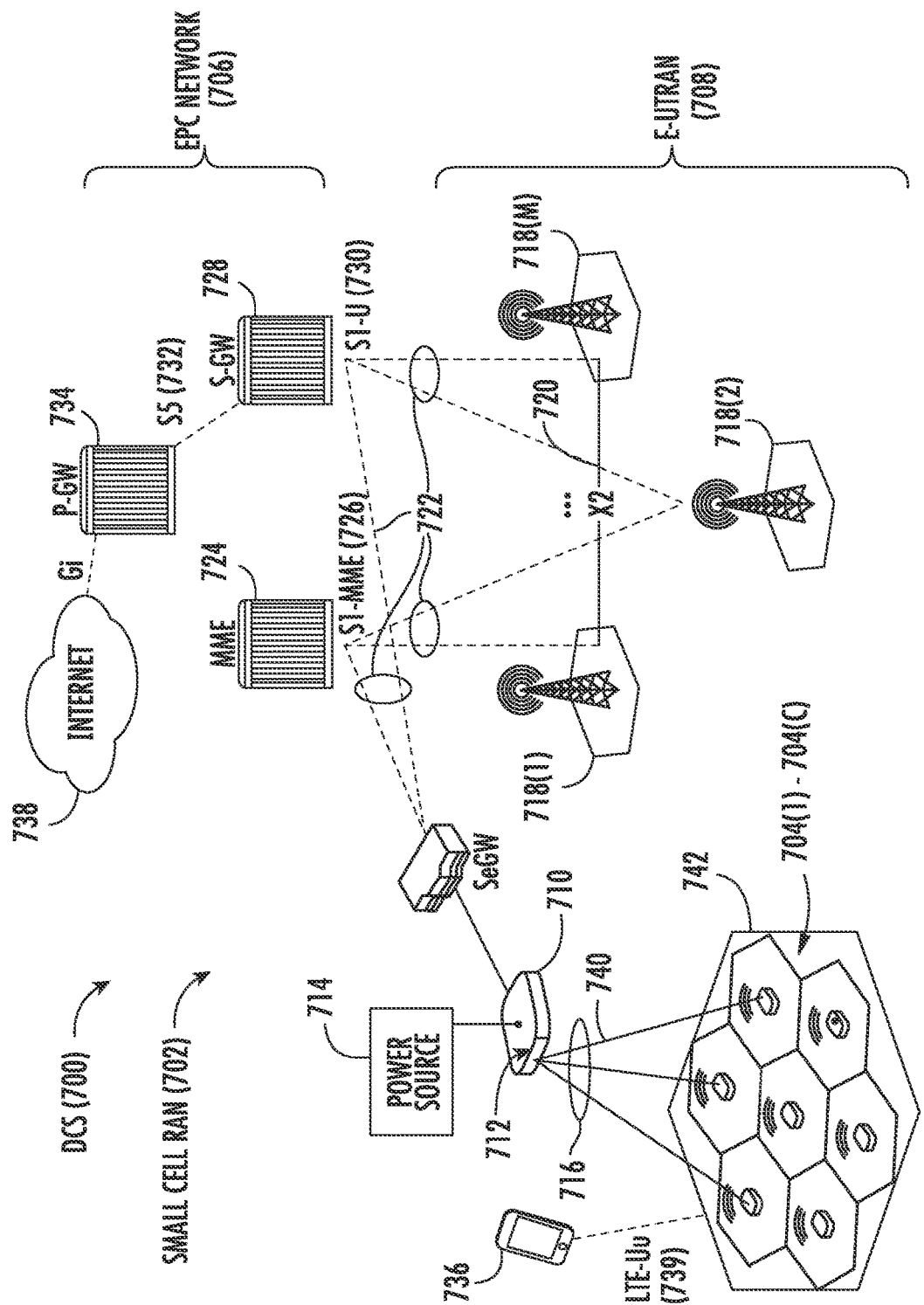
FIG. 7 is a schematic diagram of another DCS in the form of an exemplary small cell radio access network (RAN) that includes small cell radio access nodes communicatively connected to an evolved packet core (EPC) and Evolved Universal Mobile Telecommunications System (UMTS) Terrestrial Radio Access Network (E-UTRAN) arranged under Long Term Evolution (LTE) for a mobile telecommunications environment, and a power distribution system configured to receive power from a power source and distribute the received power over power conductors to one or more remote power consuming loads for powering their operations, wherein the power distribution circuit is further configured to distribute higher current demanded by a power consuming load(s) exceeding overcurrent limits of a current limiter circuit for the power source in the power distribution system, including but not limited to the power distribution systems in FIGS. 2, 4, and 5.

FIG. 7 is a schematic diagram of another DCS 700 in the form of a small cell radio access network (RAN) 702 that includes small cell radio access nodes 704(1)-704(C) communicatively connected to an evolved packet core (EPC) 706 and Evolved Universal Mobile Telecommunications System (UMTS) Terrestrial Radio Access Network (E-UTRAN) 708 arranged under Long Term Evolution (LTE) for a mobile telecommunications environment. The small cell RAN 702 includes a services node 710 that can include a power distribution system 712 configured to receive power from a power source 714 and distribute the received power over power conductors 716 to one or more small cell radio access nodes 704(1)-704(C) for powering their operations, wherein the power distribution system 712 is further configured to distribute higher current demanded by a power consuming load(s) exceeding overcurrent limits of a current limiter circuit for the power source in the power distribution system 712. The power distribution system 712 may be, without limitation, the power distribution systems 200, 400, 504 in FIGS. 2, 4, and 5.

With reference to FIG. 7, the small cell RAN 702 forms an access network (i.e., an E-UTRAN under 3GPP. There is no centralized controller in the E-UTRAN 708, hence an LTE network architecture is commonly said to be "flat." Macrocells 718(1)-718(M) are typically interconnected using an X2 interface 720. The macrocells 718(1)-718(M) are also typically connected to the EPC network 702 by means of an S1 interface 722. More particularly, the macrocells 718(1)-718(M) are connected to a Mobility Management Entity (MME) 724 in the EPC network 706 using an S1-MME interface 726, and to a Serving Gateway (SGW) 728 using an S1-U interface 730. An S5 interface 732 couples the SGW 728 to a Packet Data Network Gateway (PGW) 734 in the EPC network 706 to provide user mobile communications devices 736 with connectivity to the Internet 738. A user mobile communications device 736 can connect to the small cell radio access nodes 704(1)-704(C) in the small cell RAN 702 over an LTE-Uu interface 739.

The macrocells 718(1)-718(M) and the small cell RAN 702 are connected to the MME 724 and SGW 728 in the EPC network 706 using the appropriate S1 interface connections 722. Accordingly, as each of the small cell radio access nodes 704(1)-704(C) in the small cell RAN 702 is operatively coupled to the services node 710 over a LAN connection 740, the communications connections from the small cell radio access nodes 704(1)-704(C) are aggregated to the EPC network 706. Such aggregation preserves the flat characteristics of the LTE network while reducing the number of S1 interface connections 722 that would otherwise be presented to the EPC network 706. Thus, the small cell RAN 702 essentially appears as a single Evolved Node B (eNB) 742 to the EPC network 706, as shown.

A user mobile communications device 736 will actively or passively monitor a cell in a macrocell 718(1)-718(M) in the E-UTRAN 708 in the communications range of the user mobile communications device 736 as the user mobile communications device 736 moves throughout the small cell RAN 702. Such a cell is termed the "serving cell." For example, if user mobile communications device 736 is in communication through an established communications session with a particular small cell radio access node 704(1)-704(C) in the small cell RAN 702, the particular small cell radio access node 704(1)-704(C) will be the serving cell to the user mobile communications device 736, and the small cell RAN 702 will be the serving RAN. The user mobile communications device 736 will continually evaluate the quality of a serving cell as compared with that of a neighboring cell in the small cell RAN 702. A neighboring cell is a cell among the small cell RAN 702 and the macrocells 718(1)-718(M) that is not in control of the active communications session for a given user mobile communications device 736, but is located in proximity to a serving cell to a user mobile communications device 736 such that the user mobile communications device 736 could be in communications range of both its serving cell and the neighboring cell. Both small cell radio access nodes 704(1)-704(C) and the macrocells 718(1)-718(M) can identify themselves to a user mobile communications device 736 using a respective unique Physical Cell Identity (PCI) and a public land mobile network (PLMN) identification (ID) (PLMN ID) that are transmitted over a downlink to the user mobile communications device 736. Each of the small cell radio access nodes 704(1)-704(C) and the macrocells 718(1)-718(M) can assign a physical channel identity (PCI) that allows user mobile communications device 736 to distinguish adjacent cells.

Figure 8:
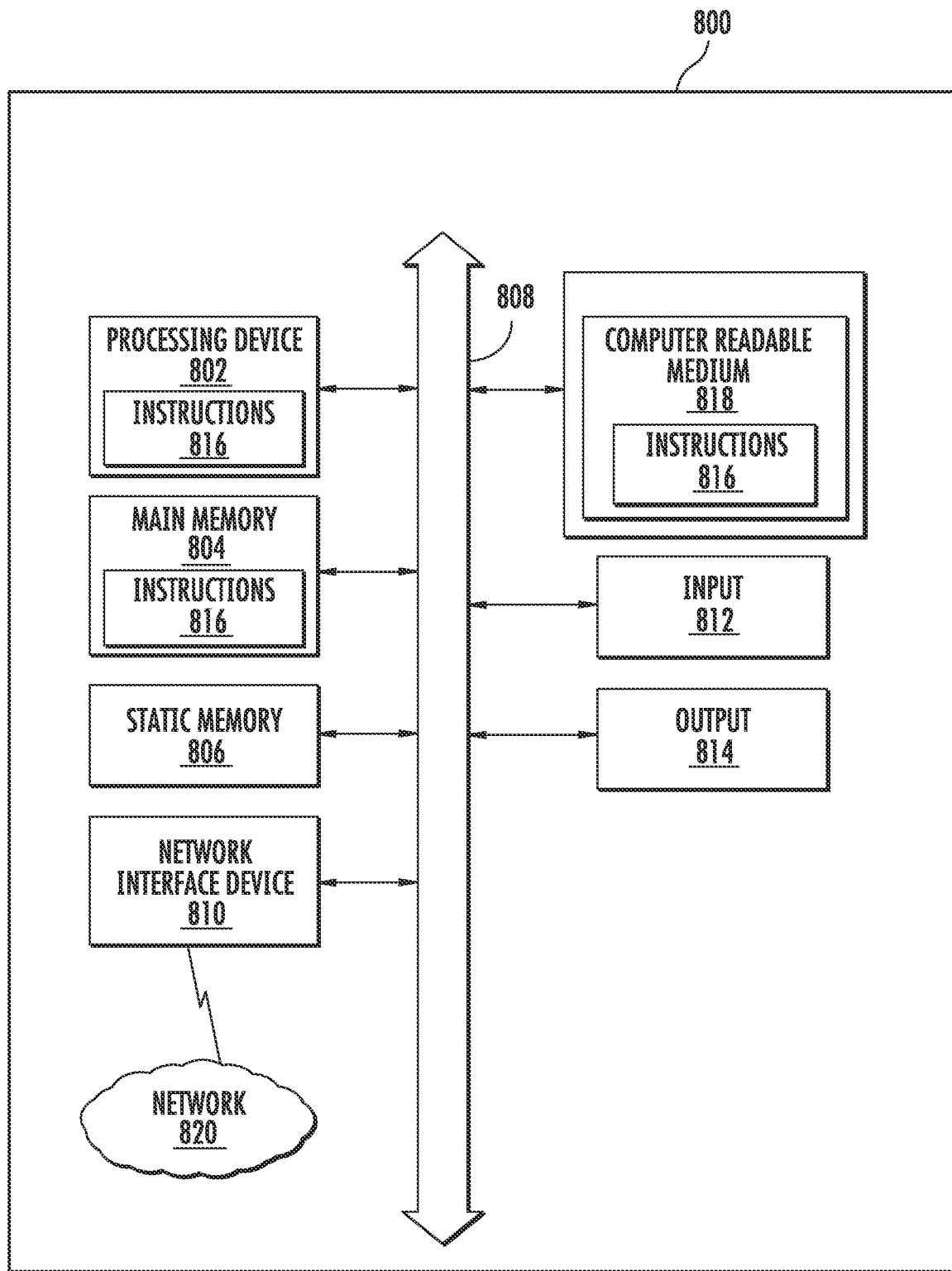
FIG. 8 is a schematic diagram of a generalized representation of an exemplary computer system that can be included in any component in a power distribution system configured to distribute higher current demanded by a power consuming load(s) exceeding overcurrent limits of a current limiter circuit for the power source in the power distribution system, including but not limited to the power distribution systems in FIGS. 2, 4, 5, and 7, wherein an exemplary computer system is adapted to execute instructions from an exemplary computer readable link.

FIG. 8 is a schematic diagram representation of additional detail illustrating a computer system 1200 that could be employed in any component of a power distribution system configured to receive power from a power source and distribute the received power to one or more remote units for powering their operations, wherein the power distribution system is further configured to distribute higher current demanded by a power consuming load(s) exceeding overcurrent limits of a current limiter circuit for the power source in the power distribution system. The power distribution system may be, without limitation, the power distribution systems 200, 400, 504, 712 in FIGS. 2, 4, 5 and 7. In this regard, the computer system 1200 is adapted to execute instructions from an exemplary computer-readable medium to perform these and/or any of the functions or processing described herein.

The computer system 800 in FIG. 8 may include a set of instructions that may be executed to program and configure programmable digital signal processing circuits in a DCS for supporting scaling of supported communications services. The computer system 800 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 800 in this embodiment includes a processing device or processor 802, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processor 802 may be connected to the main memory 804 and/or static memory 806 directly or via some other connectivity means. The processor 802 may be a controller, and the main memory 804 or static memory 806 may be any type of memory.

The processor 802 represents one or more general-purpose processing devices, such as a microprocessor, central processing unit, or the like. More particularly, the processor 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 802 is configured to execute processing logic in instructions for performing the operations and steps discussed herein.

The computer system 800 may further include a network interface device 810. The computer system 800 also may or may not include an input 812, configured to receive input and selections to be communicated to the computer system 800 when executing instructions. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processor 802 during execution thereof by the computer system 800, the main memory 804 and the processor 802 also constituting computer-readable medium. The instructions 816 may further be transmitted or received over a network 820 via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A power distribution circuit, comprising:
    a source power management circuit (PMC) comprising:
        a source power input;
        a source current limiter circuit coupled to the source power input and a source power output;
        the source PMC configured to receive source current of a source power on a source power input from a power source;
        the source current limiter circuit configured to limit the source current to a source current threshold limit to generate a limited source current; and
        the source PMC further configured to distribute the limited source current on the source power output;
    one or more remote PMCs comprising:
        a remote power output coupled to a remote unit among one or more remote units;
        each of the one or more remote PMCs configured to:
            receive a remote current on a remote power input coupled to the source power output based on the limited source current; and
            distribute the remote current to the remote unit coupled to the remote power output; and
    an energy storage circuit coupled to source power output, the energy storage circuit configured to:
        store energy from the limited source current on the source power output in response to a current demand by the one or more remote PMCs being less than the source current threshold limit.

2. The power distribution circuit of claim 1, wherein the energy storage circuit is further configured to not store energy from the limited source current on the source power output in response to the current demand by the one or more remote PMCs being greater than the source current threshold limit.

3. The power distribution circuit of claim 1, wherein the energy storage circuit is configured to store energy from the limited source current on the source power output in response to the current demand by the one or more remote PMCs being less than the limited source current.

4. The power distribution circuit of claim 1, wherein the energy storage circuit is further configured to not store energy from the limited source current on the source power output in response to the current demand by the one or more remote PMCs being greater than the limited source current.

5. The power distribution circuit of claim 1, wherein further in response to the current demand by the one or more remote PMCs being greater than the limited source current, the energy storage circuit is further configured to discharge stored energy on the source power output.

6. The power distribution circuit of claim 1, wherein:
the source PMC further comprises a source voltage sensing circuit coupled to the source power output;
the source voltage sensing circuit is configured to:
sense a source voltage on the source power output; and
generate a source voltage state signal on a source voltage state output based on the sensed source voltage; and
the one or more remote PMCs each further comprise:
a remote control circuit comprising a remote voltage state input coupled the source voltage state output;
a remote switch coupled to the remote power output and between the remote power input and the remote power output; and
the remote control circuit configured to:
cause the remote switch to be opened to decouple the distribution of the remote current to the remote power output in response to the source voltage state signal indicating a voltage across the energy storage circuit less than the source voltage.

7. The power distribution circuit of claim 6, wherein the voltage across the energy storage circuit is less than the source voltage when the energy storage circuit is not fully charged.

8. The power distribution circuit of claim 6, wherein the remote control circuit is further configured to cause the remote switch to be closed to couple the distribution of the remote current to the remote power output in response to the voltage across the energy storage circuit being equal to the source voltage.

9. The power distribution circuit of claim 8, wherein the voltage across the energy storage circuit is equal to the source voltage when the energy storage circuit is fully charged.

10. The power distribution circuit of claim 8, wherein the one or more remote PMCs each further comprise:
a remote current sensor circuit coupled to the remote power input, the remote current sensor circuit configured to generate a remote current signal on a remote current state output coupled to the remote control circuit; and
the remote control circuit is further configured to cause the remote switch to be opened to decouple the distribution of the remote current to the remote power output in response to the remote current signal indicating a current level of the remote current greater than a remote current threshold.

11. The power distribution circuit of claim 10, wherein the remote control circuit is further configured to cause the remote switch to be opened to decouple the distribution of the remote current to the remote power output in response to the source voltage state signal indicating a voltage level of the source voltage greater than a source voltage, and the remote current signal indicating a current level of the remote current greater than the remote current threshold.

12. The power distribution circuit of claim 11, wherein the remote control circuit is further configured to periodically check a remote current state in response to the remote current signal indicating a current level of the remote current greater than the remote current threshold.

13. The power distribution circuit of claim 1, wherein the one or more remote PMCs each further comprise a remote current limiter circuit coupled to the remote power input and between the remote power input and the remote power output, the remote current limiter circuit configured to:
limit the received remote current to a limited remote current; and
distribute the limited remote current to the remote unit coupled to the remote power output.

14. The power distribution circuit of claim 13, wherein the remote current limiter circuit comprises a negative temperature coefficient (NTC) resistor circuit.

15. The power distribution circuit of claim 10, wherein the one or more remote PMCs each further comprise:
a remote current sensor circuit coupled to the remote power output, the remote current sensor circuit configured to generate a remote current signal on a remote current state output coupled to the remote control circuit;
a remote current limiter circuit coupled to the remote current sensor circuit and the remote power output, the remote current limiter circuit configured to:
limit the received remote current to a limited remote current; and
distribute the limited remote current to the remote unit coupled to the remote power output; and
a remote current limiter bypass switch coupled to the remote power output;
the remote control circuit further configured to:
cause the remote current limiter bypass switch to be opened to cause the remote current limiter circuit to limit the received remote current to the limited remote current, in response to the voltage across the energy storage circuit being equal to the source voltage and the remote current signal indicating a remote non-overcurrent state.

16. The power distribution circuit of claim 15, wherein the remote control circuit is further configured to cause the remote current limiter bypass switch to be closed to bypass the remote current to the remote power output in response to the remote control circuit causing the remote switch to be closed and a passage of a defined time after the the remote control circuit causes the remote switch to be closed.

17. The power distribution circuit of claim 15, wherein the remote control circuit is further configured to cause the remote current limiter bypass switch to be opened to cause the remote current limiter circuit to limit the received remote current to the limited remote current in response to the remote current signal indicating a remote non-overcurrent state.

18. The power distribution circuit of claim 1, wherein:
the source PMC further comprises:
a current measurement circuit coupled to the source power input, the current measurement circuit configured to measure the source current at the source power input and generate a current measurement on a current measurement output based on measured source current at the source power input; and
a safety control circuit configured to:

determine if the measured source current exceeds a predefined current threshold level; and in response to the measured source current exceeding the predefined current threshold level, communicate a distribution power connection control signal to the one or more remote units to cause the one or remote units to decouple from the one or more remote power outputs of the respective one or more remote PMCs.

19. A method of distributing power to one or more remote units in a power distribution system, comprising:

receiving a source current of a source power from a power source;

limiting the source current to a source current threshold limit to generate a limited source current;

distributing the limited source current to at least one remote power management circuit (PMC) among one or more remote PMCs;

receiving a remote current at each remote PMC among the at least one remote PMC based on the limited source current;

distributing the remote current to a remote unit coupled to the remote PMC in response to a current demand by the at least one remote PMC among the one or more remote PMCs;

storing energy from the limited source current in an energy storage circuit coupled to the at least one remote PMC in response to the current demand by the at least one remote PMC among the one or more remote PMCs being less than the source threshold current limit; and discharging stored energy in the energy storage circuit in response to the current demand of the at least one remote PMC being greater than the source threshold current limit.

20. The method of claim 19, further comprising not storing energy from the limited source current in the energy storage circuit in response to the current demand by the at least one remote PMC being greater than the source current threshold limit.

21. The method of claim 19, comprising storing energy from the limited source current in the energy storage circuit in response to the current demand by the at least one remote PMC being less than the limited source current.

22. The method of claim 19, further comprising:

sensing a source voltage of the received source power; and decoupling the distribution of the remote current to the at least one remote PMC in response a voltage across the energy storage circuit being less than the source voltage of the source power.

23. The method of claim 22, further comprising coupling the distribution of the remote current to the at least one remote PMC in response to the voltage across the energy storage circuit being equal to the source voltage.

24. The method of claim 22, further comprising:

sensing the remote current received by the at least one PMC;

decoupling the distribution of the remote current to the at least one remote PMC in response to a current level of sensed remote current being greater than a remote current threshold.

25. The method of claim 24, further comprising decoupling the distribution of the remote current to the at least one remote PMC in response to a voltage level of the sensed source voltage of the source power being greater than a source voltage, and the current level of the sensed remote current being greater than the remote current threshold.

26. The method of claim 25, further comprising periodically re-sensing the remote current and decoupling the distribution of the remote current to the at least one remote PMC in response to the current level of sensed remote current being greater than the remote current threshold.

27. The method of claim 19, further comprising:

limiting the received remote current at each remote PMC among the at least one remote PMC to a limited remote current; and distributing the limited remote current to the remote unit coupled to each remote PMC among the at least one remote PMC.

28. The method of claim 24, further comprising:

limiting the received remote current at each remote PMC among the at least one remote PMC to a limited remote current;

distributing the limited remote current to the remote unit coupled to each remote PMC among the at least one remote PMC; and causing the limiting of the received remote current at each remote PMC among the at least one remote PMC, in response to the voltage across the energy storage circuit being equal to the source voltage and the current level of the sensed remote current being greater than the remote current threshold level.

29. The method of claim 28, further comprising bypassing the limiting of the received remote current in response to a remote control circuit after a passage of a defined time after the limiting of the received remote current.

30. The method of claim 29, further comprising not bypassing the limiting of the received remote current in response to the current level of the sensed remote current being less than the remote current threshold.

* * * * *

UNITED STATES PATENT AND TRADEMARK OFFICE
CERTIFICATE OF CORRECTION

| | | |
|---|---|---|
| PATENT NO. | : 11,381,099 B2 | Page 1 of 1 |
| APPLICATION NO. | : 17/238053 | |
| DATED | : July 5, 2022 | |
| INVENTOR(S) | : Ami Hazani | |

It is certified that error appears in the above-identified patent and that said Letters Patent is hereby corrected as shown below:

In the Claims

In Column 30, Line 50, in Claim 16, delete "the the" and insert -- the --.

Signed and Sealed this
Twentieth Day of September, 2022

*Katherine Kelly Vidal*

Katherine Kelly Vidal
*Director of the United States Patent and Trademark Office*